(12) United States Patent
Lee et al.

(10) Patent No.: US 12,260,401 B2
(45) Date of Patent: Mar. 25, 2025

(54) ELECTRONIC DEVICE FOR TRANSMITTING TRANSACTION BY USING EXTERNAL DEVICE AND OPERATION METHOD THEREOF

(71) Applicant: SAMSUNG ELECTRONICS CO., LTD., Suwon-si (KR)

(72) Inventors: Youna Lee, Suwon-si (KR); Seongmin Je, Suwon-si (KR); Sungjin Park, Suwon-si (KR); Minkyung Shin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 45 days.

(21) Appl. No.: 18/198,962

(22) Filed: May 18, 2023

(65) Prior Publication Data

US 2023/0289786 A1    Sep. 14, 2023

Related U.S. Application Data

(63) Continuation of application No. PCT/KR2022/015072, filed on Oct. 7, 2022.

(30) Foreign Application Priority Data

Oct. 20, 2021    (KR) .................. 10-2021-0140358

(51) Int. Cl.
*G06Q 20/38* (2012.01)
*G06Q 20/02* (2012.01)
(Continued)

(52) U.S. Cl.
CPC ......... *G06Q 20/3827* (2013.01); *G06Q 20/02* (2013.01); *G06Q 20/38215* (2013.01); *G06Q 20/3825* (2013.01)

(58) Field of Classification Search
CPC ............... G06Q 20/3827; G06Q 20/02; G06Q 20/38215; G06Q 20/3825; G06F 3/048;
(Continued)

(56) References Cited

U.S. PATENT DOCUMENTS 11,392,933 B2 * 7/2022 Mossler ............. G06Q 20/3223
2018/0144114 A1   5/2018 Fiske
(Continued)

FOREIGN PATENT DOCUMENTS

| CN | 109214816 A | 1/2019 |
|---|---|---|
| CN | 110807624 A | 2/2020 |

(Continued)

OTHER PUBLICATIONS

Shah et al. "Recent Trends in User Authentication—A Survey", IEEE Access, vol. 7, 2019 with version of Aug. 27, 2019, pp. 112505-112519 (Year: 2019).*

(Continued)

*Primary Examiner* — James D Nigh
(74) *Attorney, Agent, or Firm* — Sughrue Mion, PLLC

(57) ABSTRACT

An electronic device including a processor that generates first identification data including a unique value corresponding to an external device, transmits an authentication request including information on a blockchain application and the first identification data to the external device, receives, a random value generated from the external device if authentication is successful, transmits a signature request including the random value and information on a transaction to the external device, generates a first hash value for the transaction, receives a second hash value for the transaction, which is generated based on verification of the random value, and signature data obtained by performing digital signature to the transaction with a private key stored in the external device, and determines whether to transmit the transaction to (Continued)

the blockchain network, based on the first hash value and the second hash value.

20 Claims, 11 Drawing Sheets

(51) Int. Cl.
    *G06F 3/048*     (2013.01)
    *H04L 9/00*     (2022.01)
    *H04L 9/08*     (2006.01)
    *H04L 9/32*     (2006.01)

(58) Field of Classification Search
    CPC ..... H04L 9/00; H04L 9/08; H04L 9/32; H04L 9/3236; H04L 9/0894; H04L 9/3247; H04L 9/3265; H04L 9/50; H04L 2209/56
    USPC ......................................................... 705/75
    See application file for complete search history.

(56) References Cited

U.S. PATENT DOCUMENTS

| | | |
|---|---|---|
| 2018/0367316 A1 | 12/2018 | Cheng et al. |
| 2020/0167776 A1 | 5/2020 | Collinge |
| 2020/0177377 A1 | 6/2020 | Smith et al. |
| 2021/0056545 A1 | 2/2021 | McCauley et al. |
| 2021/0075623 A1 | 3/2021 | Petersen |
| 2021/0083871 A1 | 3/2021 | Smirnov |
| 2021/0083872 A1 | 3/2021 | Desmarais et al. |
| 2021/0097528 A1 | 4/2021 | Wang |
| 2021/0105142 A1 | 4/2021 | Lee et al. |
| 2021/0209589 A1 | 7/2021 | Leong |
| 2021/0250179 A1 | 8/2021 | Sato et al. |

FOREIGN PATENT DOCUMENTS

| | | | |
|---|---|---|---|
| EP | 3217308 B1 * | 12/2018 | ............... G06F 1/00 |
| KR | 10-2019-0128868 A | 11/2019 | |
| KR | 10-2021-0041404 A | 4/2021 | |
| WO | 2021/061415 A1 | 4/2021 | |

OTHER PUBLICATIONS

International Search Report (PCT/ISA/210) issued Jan. 26, 2023 by the International Searching Authority in counterpart International Patent Application No. PCT/KR2022/015072.

Written Opinion (PCT/ISA/237) issued Jan. 26, 2023 by the International Searching Authority in counterpart International Patent Application No. PCT/KR2022/015072.

Extended European Search Report dated Nov. 25, 2024, issued by the International Searching Authority in International Application No. 22883832.2.

* cited by examiner

US 12,260,401 B2

ELECTRONIC DEVICE FOR TRANSMITTING TRANSACTION BY USING EXTERNAL DEVICE AND OPERATION METHOD THEREOF

CROSS-REFERENCE TO RELATED APPLICATION(S)

This application is a bypass continuation application of PCT Application No. PCT/KR2022/015072, filed on Oct. 7, 2022, which is based on and claims priority under 35 U.S.C. § 119(a) from Korean Patent Application No. 10-2021-0140358, filed on Oct. 20, 2021, in the Korean Intellectual Property Office, the disclosures of which are incorporated by reference herein in their entirety.

BACKGROUND

1. Field

The disclosure relates to an electronic device for confirming a transaction by using an external device, and an operation method thereof.

2. Description of Related Art

A blockchain network is a decentralized network, which is different from a centralized network, in which, decision making is performed by a central server. A blockchain network may refer to a network in which decision making is performed according to a consensus algorithm of nodes participating in the blockchain network.

Among the nodes participating in the blockchain network, a node requesting to perform a transaction may transmit a transaction to the blockchain network. In this case, the node requesting a transaction may generate a transaction and transmit the transaction digitally signed with a private key to the blockchain network in order to prove integrity. The private key used for the digital signature may be generated using seed value (e.g., root seed) information. For example, a seed value may be generated according to a scheme (e.g., a true random number generator (TRNG)) for each electronic device, and a private key and a public key corresponding to the private key may be generated from the generated seed value.

Electronic devices serving as clients, which are included in the blockchain network, may perform related operations in a blockchain system while maintaining security and integrity by using respective public keys and private keys thereof. In this case, it may be important to prevent a third party from discovering a private key. Accordingly, an electronic device may store a private key in a separate security area. For example, the electronic device may store the private key in an area (e.g., a secure zone accessible only via a secure OS (e.g., trust zone)) that stores data requiring a relatively high security level, or may store the same in a separate external device (e.g., a cold wallet or a hardware wallet). The electronic device having stored the private key in a separate area may access the area (e.g., requesting access to a secure area or connecting to an external device) whenever it is necessary to use the private key in the blockchain network, and may perform an operation (e.g., digital signature or decrypting data encrypted with a public key) using the private key.

Storing information as a private key or a seed value or a reminder associated with the private key in a memory area of the electronic device may cause a serious security problem. For example, a digital wallet, such as a Bitcoin wallet, may include software (e.g., electronic wallet) that enables a connection to another node participating in a blockchain, for transaction authentication when generating a transaction for transmitting Bitcoin. For example, a private key may be used to perform encryption and/or decryption of important information required for a blockchain transaction by using a symmetric key encryption scheme, and to perform digital signature on a transaction. A private key used to generate a transaction may be stored in a wallet installed on an electronic device ("client-side") or a wallet service provider ("server-side"). If the wallet on the server side, which is accessed using an internet connection, is hacked due to a security issue, there is a problem that the private key may be leaked.

In order to solve this problem, the electronic device may use a private key stored in a separate external device (e.g., a cold wallet or a hardware wallet) without being connected online. However, a hacking problem may occur even when a private key stored in an external device is used.

For example, when an electronic device requests digital signature for a transaction to an external device, and the external device transmits signature data, which is obtained by performing digital signature to the transaction with a private key, to the electronic device, information on the transaction may be forged during the transmission. Alternatively, when a blockchain application (e.g., a blockchain wallet-related application) that is downloaded on to the electronic device is damaged, a hacking problem may occur with respect to a transaction based on the damaged blockchain application.

According to an aspect of the disclosure, there is provided an electronic device including: a communication circuit configured to communicate with a blockchain network; a display; a memory configured to store a blockchain application; and at least one processor operatively connected to the communication circuit, the display, and the memory, wherein the at least one processor may be configured to: generate first identification data comprising a first value corresponding to an external device communicatively connected to the electronic device; transmit an authentication request comprising first information and the first identification data to the external device, the first information including information related to the blockchain application; receive a second value from the external device based on a result of the authentication request being successful; transmit, to the external device, a signature request comprising the second value and second information, the second information including information related to a transaction generated by the electronic device; generate a first hash value for the transaction; receive, from the external device, a second hash value for the transaction, the second hash value being generated based on verification of the second value, and signature data obtained by performing digital signature to the transaction with a private key stored in the external device; and determine whether to transmit the transaction to the blockchain network, based on the first hash value and the second hash value.

According to an aspect of the disclosure, there is provided an operation method of an electronic device, the method may include: generating first identification data comprising a first value corresponding to an external device communicatively connected to the electronic device; transmitting an authentication request comprising first information and the first identification data to the external device, the first information including information related to a blockchain application; in response to the authentication request, receiving a second value from the external device based on a result of the authentication request being successful; transmitting, to the external device, a signature request comprising the second value and second information, the second information including information related to a transaction generated by the electronic device; generating a first hash value for the transaction; receiving, from the external device, a second hash value for the transaction, the second hash value being generated based on verification of the second value, and signature data obtained by performing digital signature to the transaction with a private key stored in the external device; and determining whether to transmit the transaction to a blockchain network, based on the first hash value and the second hash value.

According to an aspect of the disclosure, there is provided an electronic device including: a communication circuit configured to communicate with a blockchain network; a display; a memory configured to store a blockchain application; and at least one processor operatively connected to the communication circuit, the display, and the memory, wherein the at least one processor may be configured to: generate first identification data comprising a first value corresponding to an external device communicatively connected to the electronic device; transmit an authentication request comprising first information and the first identification data to the external device, the first information including information related to the blockchain application; receive an authentication result from the external device in response to the authentication request; display an authentication result screen corresponding to the authentication result on the display; based on the authentication result, generate a first hash value for a transaction generated by the electronic device; receive, from the external device, a second hash value for the transaction, the second hash value being generated based on the authentication result; display a screen, on the display, for requesting a comparison between the first hash value and the second hash value; receive a user input corresponding to the comparison request; and determine whether to transmit the transaction to the blockchain network, based on the user input.

According to an aspect of the disclosure, there is provided an electronic device including: a memory storing one or more instructions; at least one processor configured to execute the one or more instructions to: transmit, to an external device, an authentication request comprising first information and identification data corresponding to the external device, the first information including information related to a blockchain application; receive second information from the external device based on a result of the authentication request being successful; transmit, to the external device, a signature request comprising the second information and third information including information related to a transaction generated based on the blockchain application; generate a first hash value corresponding to the transaction; receive, from the external device, a second hash value generated based on verification of the first information, and signature data obtained by performing digital signature to the transaction with a private key stored in the external device; and determine whether to transmit the transaction to the blockchain network, based on the first hash value and the second hash value.

According to one or more example embodiments of the disclosure, an electronic device can distribute and securely store a key value.

The electronic device according to one or more example embodiments of the disclosure can store a private key in an external device and perform digital signature using the private key, thereby transmitting a transaction with guaranteed integrity to a blockchain network.

The electronic device according to one or more example embodiments of the disclosure can improve a security problem based on a compromised electronic device and/or a blockchain application by performing, via the electronic device, verification of the electronic device and verification of the blockchain application executed in the electronic device.

The electronic device according to one or more example embodiments of the disclosure can verify the electronic device and the external device, based on identification data indicating a unique value corresponding to the external device.

The electronic device according to one or more example embodiments of the disclosure can verify whether a transaction generated by the electronic device has been tampered with, based on information on the transaction and information on the transaction with digital signature (electrically signed) with a private key via the external device. Therefore, security problems related to transmission of a transaction in the blockchain network can be improved.

The effects obtainable in the disclosure are not limited to the above-mentioned effects, and other effects that are not mentioned may be clearly understood by those skilled in the art to which the disclosure belongs, from the descriptions below.

DETAILED DESCRIPTION

Figure 1:
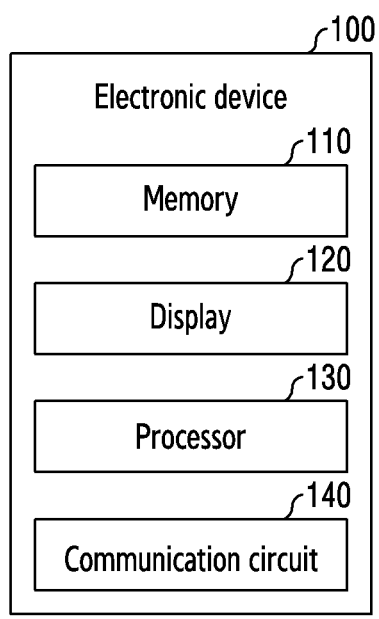
FIG. 1 is a block diagram of an electronic device according to an example embodiment.

FIG. 1 is a block diagram of an electronic device according to an example embodiment.

Referring to FIG. 1, an electronic device 100 may include a memory 110, a display 120, a processor 130, a communication circuit 140 according to an example embodiment. However, the disclosure is not limited thereto, and as such, the electronic device may include a combination of one or more of the elements illustrated in FIG. 1 according to another example embodiment. In one or more example embodiments, the electronic device 100 may include an additional element in addition to the elements illustrated in FIG. 1, or may omit at least one of the elements illustrated in FIG. 1.

According to an example embodiment, the memory 110 may store instructions, when executed, causing the processor 130 to control the elements of the electronic device 100 or process data so as to perform operations of the electronic device 100. According to an example embodiment, the memory 110 may include at least one blockchain application that performs a blockchain-related operation. For example, a blockchain application that performs a blockchain-related operation and/or a wallet application that performs a transaction-related operation in a blockchain network may be included. Therefore, the blockchain application may include instructions, when executed, causing the processor 130 to control the elements of the electronic device 100 to perform blockchain-related operations.

According to an example embodiment, the memory 110 may store a blockchain application downloaded via a server by a user or the processor 130 of the electronic device 100. For example, the blockchain application may be an application related to a blockchain wallet. For example, the application related to a blockchain wallet may open an account used in the blockchain network and may perform a blockchain-related function of sending or depositing virtual currency. According to an example embodiment, the memory 110 may store various data necessary for the operation of the blockchain application. For example, the memory 110 may store identification information (e.g., wallet id) of a cold wallet related to an operation of a blockchain wallet application. According to an example embodiment, the memory 110 may include a security area. The memory 110 may store, in an area (e.g., the security area) of the memory 110, encrypted identification information of the cold wallet and/or data (e.g., a private key) required for digital signature in an encrypted transaction.

An operation for authenticating that a particular user has signed on data in a digital environment is referred to the digital signature. For example, the operation for performing the digital signature may comprise encrypting data using a user's private key. The encrypted data using the private key may be authenticated that it was signed by the specific user by being decrypted using the public key. However, this merely is an example of a digital signature algorithm, and the method of performing the digital signature is not limited thereto.

According to an example embodiment, when the electronic device 100 operates as a block node of the blockchain network, the memory 110 may include a distributed ledger for the blockchain network. According to an example embodiment, the distributed ledger may include at least one block and a state database, each of which includes at least one transaction in the blockchain network. According to an example embodiment, the memory 110 may include at least one smart contract executed in response to a transaction execution request. Accordingly, in response to the transaction request, the electronic device 100 may acquire a smart contract for the requested transaction from the memory 110 and may execute the smart contract.

According to an example embodiment, the display 120 may display various contents (e.g., text, an image, a video, an icon, and/or a symbol, etc.). According to an example embodiment, the display 120 may include a liquid crystal display (LCD), a light emitting diode (LED) display, or an organic light emitting diode (OLED) display. According to an example embodiment, the processor 130 may display various contents related to a blockchain application via the display 120. For example, the processor 130 may display, via the display 120, various screens, such as a screen including information on a transaction, a screen indicating that a connection is made to an external device, and/or a screen indicating a result of an authentication operation via the external device.

According to an example embodiment, the external device according to an example embodiment of the disclosure may refer to a device (e.g., a cold wallet or a hardware wallet) used when the electronic device performs a blockchain-related operation (e.g., a transaction for digital currency) in the blockchain network without an internet connection.

According to an example embodiment, the processor 130 may display, via the display 120, a screen for confirmation of a transaction and may receive a user input related to the confirmation of the transaction. For example, the processor 130 may display, via the display 120, a screen including a visual object for confirmation of the transaction, and may acquire an input related to confirmation of the transaction from a user via the display 120. A screen displayed on the display 120 according to one or more example embodiments will be described later with reference to FIGS. 7, 8, 9A, 9B and 9C.

According to an example embodiment, the processor 130 may be electrically or operatively connected to the memory 110, the display 120, and the communication circuit 140. According to an example embodiment, the processor 130 may execute an operation or data processing related to control and/or communication of at least one other element of the electronic device 100, by using instructions stored in the memory 110. According to an example embodiment, the processor 130 may include at least one of a central processing unit (CPU), a graphic processing unit (GPU), a micro controller unit (MCU), a sensor hub, a supplementary processor, a communication processor, an application processor, an application-specific integrated circuit (ASIC), and field programmable gate arrays (FPGA), and may have multiple cores.

According to an example embodiment, the processor 130 may perform a blockchain-related operation via a blockchain application stored in the memory 110. According to an example embodiment, it may be understood that performing an operation related to a blockchain by the processor 130 is performing of the operation via a blockchain application.

According to an example embodiment, the processor 130 may execute an application related to a blockchain wallet and may perform an operation related to the blockchain. For example, the processor 130 may acquire a transaction request. The processor 130 of the electronic device 100 may identify a transaction request generated from a user or a blockchain application.

According to an example embodiment, the processor 130 may perform an operation for digital signature of a transaction in response to the transaction request. According to an example embodiment, the processor 130 may use an external device storing a private key in the blockchain network for the electronic device 100 so as to acquire the transaction electronically signed with the private key.

According to an example embodiment, the processor 130 may identify a transaction generation request or a connection of an external device. The processor 130 may perform verification of the electronic device 100 and/or a blockchain application. According to an example embodiment, the processor 130 may verify whether the electronic device 100 has been tampered with and/or whether the blockchain application stored in the memory 110 has been damaged.

According to an example embodiment, the processor 130 may generate first identification data including a unique value corresponding to the external device connected to the electronic device 100. According to an example embodiment, the first identification data may represent a unique value for the external device. The processor 130 may generate the first identification data by using a blockchain application. For example, when the external device is connected, the processor 130 may execute the blockchain application and may generate the first identification data for the external device. According to one or more example embodiments, the processor 130 may generate the first identification data corresponding to the external device via various methods. For example, the processor 130 may generate the first identification data, based on a root seed at a time point when the external device and the blockchain application are first connected. For example, the first identification data may be generated based on a hierarchy deterministic path (HDpath) of a designated path. For example, the first identification data may be generated by a method, such as a method of generating a public key by inputting a designated parameter in the hierarchy deterministic path.

According to an example embodiment, upon execution of the blockchain application, the first identification data may be generated via a key-manager. For example, the key-manager may generate a root seed and may generate hierarchy deterministic path-based first identification data, based on the generated root seed. According to an example embodiment, the processor 130 may generate, based on a root seed, a mnemonic word of a mnemonic hash and may generate first identification data based on the mnemonic word. A root seed may be generated using various types of seeds. For example, a hexadecimal seed may be used, or a seed including a 12-word mnemonic may be used. According to one or more example embodiments, the processor 130 may generate first identification data according to various algorithms designated between the electronic device 100 and the external device at a time point of a first connection, based on instructions stored in the memory 110.

According to an example embodiment, the processor 130 may transmit, to the external device, an authentication request including an authentication key chain and/or information on the blockchain application and the generated first identification data. For example, the processor 130 may transmit, to the external device, an authentication request including an authentication key chain, the first identification data, and information on the blockchain application, which includes a package name of the blockchain application.

According to an example embodiment, when authentication via the external device is successful, the processor 130 may receive a nonce value generated from the external device, in response to the authentication request. According to an example embodiment, the nonce value may represent a randomly generated value. For example, the nonce value may represent a random value or a random value used to identify that the external device has responded to the request transmitted from the electronic device 100 to the external device. According to an example embodiment, in response to the authentication request, the external device may perform verification of the electronic device 100 and/or perform verification of the blockchain application, and may generate a nonce value if the verification is successful. According to an example embodiment, the nonce value may indicate a unique value for the success of the verification. According to an example embodiment, if authentication is successful, the processor 130 may receive the nonce value and/or authentication result data from the external device.

According to another embodiment, the external device may perform verification of the electronic device 100 and/or perform verification of the blockchain application, and if the verification fails, the external device may transfer, to the electronic device 100, an error message indicating that the authentication has failed. Details of the authentication will be described later with reference to FIG. 4.

According to an example embodiment, the processor 130 may transmit, to the external device, a signature request including the nonce value and information on a transaction generated by the electronic device 100. According to an example embodiment, the processor 130 may transmit information on the transaction to the external device in order to perform digital signature to the transaction with a private key. For example, the processor 130 may transmit, to the external device, information on the transaction, which includes at least one of transaction data, a transmission node, a reception node, account information, time information, a remitter, a receiver, and amount information.

According to an example embodiment, the processor 130 may generate a first hash value for the transaction. According to an example embodiment, the processor 130 may generate the first hash value from information on the transaction by using a specified algorithm. For example, the processor 130 may generate a first hash value from information on the transaction by using a hash function. For example, the processor 130 may acquire a first hash value by using a hash function, such as SHA 256 for the transaction. A value representing unique data enabling identification of a transaction may correspond to first hash values shown in one or more example embodiments disclosed herein below. That is, if an identification value represents unique data enabling identification of a transaction without being limited to a first hash value, various values other than the first hash value may correspond to a hash value. For example, a unique value enabling identification of a transaction may be expressed as an identification value as well as a hash value. In conclusion, hereinafter, functions of a hash value shown in one or more example embodiments disclosed in the document are not limited to expression of a hash value, and may be replaced by the identification value.

According to an example embodiment, the processor 130 may receive, from the external device, a second hash value for the transaction and signature data obtained by performing digital signature to the transaction with a private key stored in the external device. According to an example embodiment, the external device may verify a nonce value in response to a signature request including the nonce value and information on the transaction. According to an example embodiment, the external device may perform verification of the nonce value. For example, the external device may verify whether a nonce value generated based on verification of the electronic device 100 and/or the blockchain application matches a nonce value received from the electronic device 100.

According to an example embodiment, if verification is successful, the external device may generate signature data by performing digital signature, with the private key, the transaction received from the electronic device 100. According to an example embodiment, the external device may generate the second hash value for the transaction. For example, the external device may generate the second hash value for the transaction by performing an operation similar to the operation of generating the first hash value. According to an example embodiment, the external device may transmit, to the electronic device 100, the second hash value and signature data obtained by performing digital signature to the transaction with the private key.

According to an example embodiment, if verification fails, the external device may determine that a security problem has occurred, and may transmit a message about the verification failure to the electronic device 100. The processor 130 according to an example embodiment may terminate an operation related to the transaction and display, via the display 120, a screen informing of the verification failure, based on the message related to the verification failure.

According to an example embodiment, the processor 130 may determine whether to transmit the transaction to the blockchain network, based on the first hash value generated by the electronic device 100 and the second hash value acquired from the external device. For example, the processor 130 may determine whether to transmit the transaction, which digital signature is performed with the private key, to the blockchain network, based on a result of comparison between the first hash value and the second hash value.

According to an example embodiment, the communication circuit 140 may be configured to be connected to the external device so as to transmit or receive data. According to an example embodiment, the electronic device 100 may be connected to the blockchain network via the communication circuit 140.

According to one or more example embodiments, the electronic device 100 may serve as a client while being a block node. For example, when the electronic device 100 serves as a client while being a blockchain node, the electronic device 100 may transmit the transaction to the blockchain network via the communication circuit 140 and may perform a guarantee operation and/or a consensus operation for the transaction.

Figure 2:
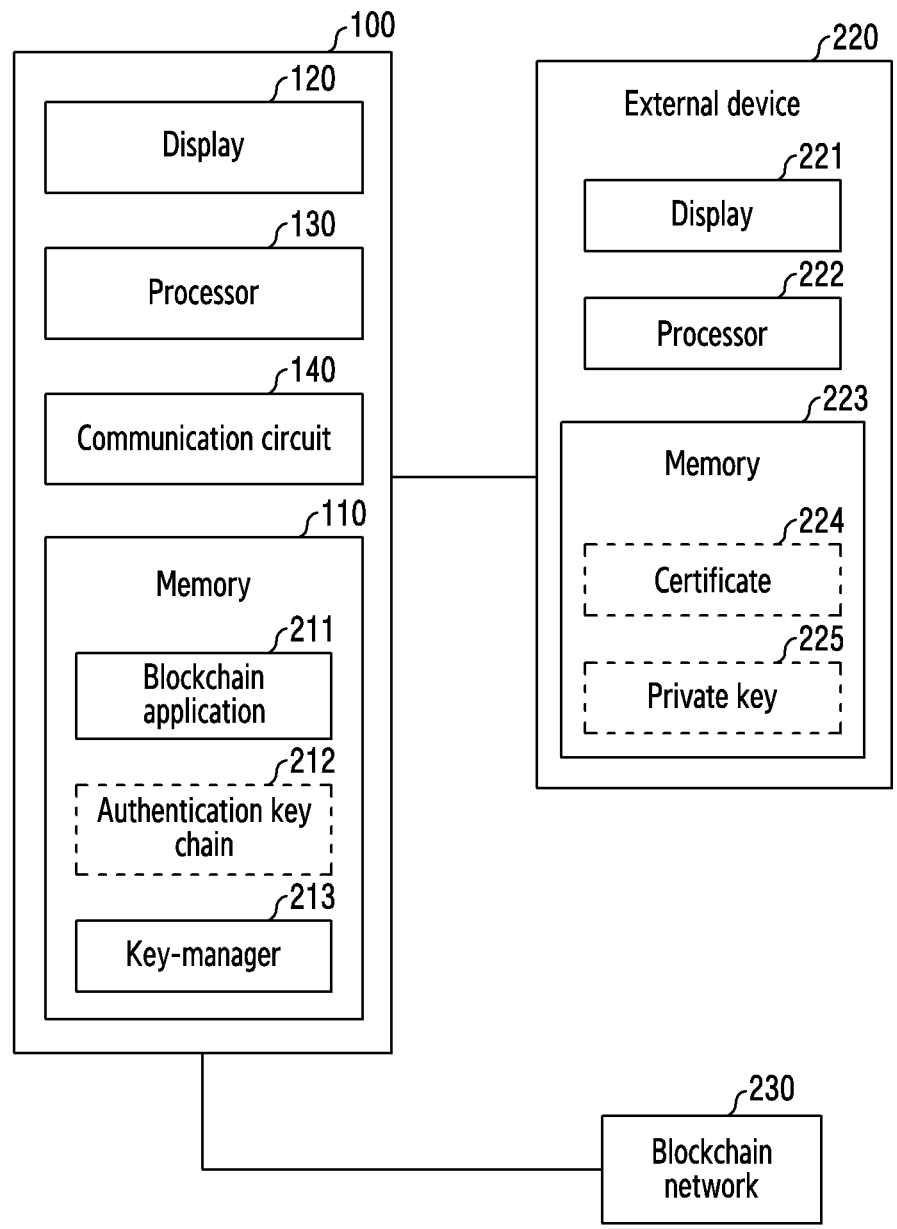
FIG. 2 is a diagram for illustrating an electronic device, an external device, and a blockchain network according to an example embodiment.

FIG. 2 is a diagram for illustrating an electronic device, an external device, and a blockchain network according to an example embodiment.

Referring to FIG. 2, the electronic device 100 may be connected to an external device 220 and may be connected to a blockchain network 230. According to an example embodiment, the electronic device 100 may be physically connected to the external device 220. For example, the external device 220 is in contact with some elements included in the electronic device 100, and therefore the electronic device 100 may be connected to the external device 220.

According to an example embodiment, the electronic device 100 may be connected to the blockchain network 230 via the communication circuit 140. For example, the electronic device 100 may transmit data to or receive from the blockchain network 230 by using the communication circuit 140. Accordingly, it may be expressed that the electronic device 100 and the blockchain network 230 are connected.

According to an example embodiment, the electronic device 100 may include the display 120, the processor 130, the communication circuit 140, and/or the memory 110. According to an example embodiment, the memory 110 may include a blockchain application 211, an authentication key chain 212, and a key-manager 213.

The blockchain application 211 according to an example embodiment may correspond to the blockchain application described with reference to FIG. 1. According to an example embodiment, the blockchain application 211 may be expressed as a wallet application. According to an example embodiment, the electronic device 100 may include at least one wallet application. For example, when a user of the electronic device 100 downloads different types of wallet applications from a server, the electronic device 100 may include multiple wallet applications.

According to an example embodiment, in performing of a blockchain-related operation, the processor 130 may execute the blockchain application 211 stored in the memory 110. For example, the processor 130 may provide a user interface (UI) by executing the blockchain application 211, and may perform various operations via the blockchain application 211.

According to an example embodiment, the blockchain application 211 may perform a blockchain-related operation when executed by the processor 130. For example, the processor 130 may perform an operation related to another configuration stored in the memory 110 via execution of the blockchain application 211. For example, the processor 130 may execute the blockchain application 211, based on requests of various applications stored in the memory 110. According to an example embodiment, the blockchain application 211 may include instructions, when executed, causing the processor 130 to control the elements of the electronic device 100 to perform a blockchain-related operation. Accordingly, an operation performed when the blockchain application 211 is executed may be expressed as an operation performed by the processor 130.

According to an example embodiment, when the blockchain application 211 is executed, an operation using the authentication key chain 212 and/or an operation of the key-manager 213 may be controlled. For example, the blockchain application 211 may execute a transaction including transaction signing and/or transaction recording on the blockchain network. According to an example embodiment, when performing an operation based on the transaction, the electronic device 100 may perform verification of the blockchain application 211. For example, the electronic device 100 may verify, via the external device 220, that the blockchain application 211 has not been tampered with.

According to an example embodiment, in order to enhance security, the electronic device 100 may include a security module (e.g., a trusted execution environment (TEE) or a secure element (SE)), which is an execution environment having multiple security levels, in an area of the memory 110 or a separate area of the electronic device 100. The security module may store data requiring a relatively high security level in a safe environment (e.g., storing data in a security area (e.g., a trust zone) accessible only via a secure OS) and may perform related operations. The security module according to an example embodiment may operate on the application processor of the electronic device 100 and may operate based on a reliable hardware structure determined during manufacturing of the electronic device 100. According to an example embodiment, the security module may be provided into an area of the memory 110 or may be provided as an element separate from the memory 110 so as to operate as a security area. For example, in terms of hardware, one processor 130 and one memory 110 may be classified into a general module (e.g., a rich execution environment (REE)) and a security module (e.g., an ARM trust zone) so as to be to be used. As another example, the security module is implemented in an on-chip form like the processor 130 of the electronic device 100, but may be implemented as a separate processing core set. As another example, the security module may be configured so that a processor for the security module is implemented as a separate hardware chip and is separated from the processor 130. The security module may configure software or hardware requiring security to operate only in the security area. The electronic device 100 may operate the memory 110 or the security module via a physical change of hardware or a logical change of software.

According to an example embodiment, the memory 110 may include the authentication key chain 212 and/or the key-manager 213. In an example embodiment, the authentication key chain 212 and/or the key-manager 213 may be included in the security module. For example, the authentication key chain 212 and/or the key-manager 213 may be included in a general area of the electronic device 100, or may be included, for another example, in the security module.

According to an example embodiment, the electronic device 100 may include an authentication key chain (e.g., a certificate chain or an attestation key) assigned to the electronic device 100. According to an example embodiment, the authentication key chain may be provided during production of the electronic device 100. As another example, the authentication key chain may be generated at a time point of using the authentication key chain in a state where a seed value for inducing of the authentication key chain is stored. According to one or more example embodiments, the authentication key chain may be configured as hardware or may be implemented as software. According to an example embodiment, the authentication key chain 212 is provided during production of the electronic device 100 and may represent a key derived from an initial device-specific key (e.g., a root attestation key). However, the authentication key chain is not limited thereto.

According to an example embodiment, the electronic device 100 may include the key-manager 213. According to an example embodiment, the processor 130 may execute instructions of the key-manager 213, which are stored in the memory 110. Hereinafter, an operation performed by the processor 130 via execution of the key-manager 213 may be described as an operation of the key-manager 213. According to an example embodiment, the key-manager 213 may generate first identification data for the external device 220 via the operation described with reference to FIG. 1. For example, upon execution of the blockchain application 211, the processor 130 may call the key-manager 213 via an API call, and the key-manager 213 may generate first identification data. The blockchain application 211 may generate, via the key-manager 213, a hash value for a transaction requested to be performed. The first hash value described with reference to FIG. 1 may be generated via the key-manager 213.

According to an example embodiment, the key-manager 213 may generate a key-pair. For example, the processor 130 may generate a private key 225 and a public key via the key-manager 213. According to an example embodiment, when the blockchain application 211 is executed, the processor 130 may request the key-manager 213 to generate a key-pair. Therefore, hereinafter, it may be expressed that key-pair generation is requested via the blockchain application 211. According to an example embodiment, the key-manager 213 may store the private key 225 and/or the public key among the generated key-pairs in a key storage. For example, the key-manager 213 may generate a key-pair and store the private key 225 in the external device 220.

According to an example embodiment, the key-manager 213 may generate a root seed and may generate the private key 225 and the public key, based on the generated root seed. In an example embodiment, the root seed may refer to a value randomly generated under a condition of a range available in the blockchain network. According to an example embodiment, the key-manager 213 may generate a public key based on a hierarchy deterministic path (HDpath) by using the root seed.

According to an example embodiment, the root seed may be used to generate a master private key and a master chain code, based on a hash value generated via an HMAC-SHAR 512 algorithm function. In a hashed value of 512 bits, left 256 bits may be used as the private key, and right 256 bits may be used as a chain code. The public key may be acquired using the private key 225 and an elliptic curve function. According to one or more example embodiments, the key-manager 213 may generate a root seed according to each scheme (e.g., TRNG) for each external device 220 and may derive a key-pair from the root seed.

According to an example embodiment, the external device 220 may represent a blockchain wallet for which security is maintained. For example, the external device 220 may be expressed as a hardware wallet or a cold wallet.

According to an example embodiment, the external device 220 may include a display 221, a processor 222, and/or a memory 223. According to an example embodiment, the display 221 may perform an operation similar to that of the display 120 described with reference to FIG. 1. The processor 222 may perform an operation similar to that of the processor 130 described with reference to FIG. 1. For example, the processor 222 may receive a request of the electronic device 100 and may control the elements included in the external device 220 in order to perform an operation in response to the request of the electronic device 100. For example, the processor 222 may execute instructions stored in the memory 223 so as to perform an operation related to the electronic device 100. In one or more example embodiments, the external device 220 may include an additional element in addition to the elements illustrated in FIG. 2, or may omit at least one of the elements illustrated in FIG. 2. For example, the external device 220 may further include a communication circuit (not illustrated) for communication with the electronic device 100 and/or the external device.

According to an example embodiment, in response to a connection to the electronic device 100, the display 221 of the external device 220 may display a screen informing of the connection. The external device 220 may display, via the display 221, transaction information acquired from the electronic device 100. Accordingly, a user of the electronic device 100 may identify transaction information displayed via the display 120 of the electronic device 100 and the transaction information displayed via the display 221 of the external device 220.

According to an example embodiment, the memory 223 of the external device 220 may include a certificate 224 and/or the private key 225. According to an example embodiment, the private key 225 may correspond to account information for the blockchain network 230. The private key 225 may represent a unique value for the blockchain network 230 of the electronic device 100. According to an example embodiment, the external device 220 may store the private key 225 generated via the key-manager 213. For another example, the external device 220 may store the private key 225 for the blockchain network 230 of the electronic device 100, which is generated by another device or element for which security is maintained.

According to an example embodiment, the external device 220 may include a certificate (e.g., an attestation root certificate) 224 for the authentication key chain 212 stored in the electronic device 100. According to an example embodiment, the external device 220 may verify, using the certificate 224, whether the electronic device 100 is a tampered device. For example, the external device 220 may receive information on the authentication key chain 212 from the electronic device 100 and may perform verification via the certificate 224 for the authentication key chain 212. The external device 220 may verify, via the certificate 224, data electronically (digitally) signed with the authentication key chain 212.

Figure 3:
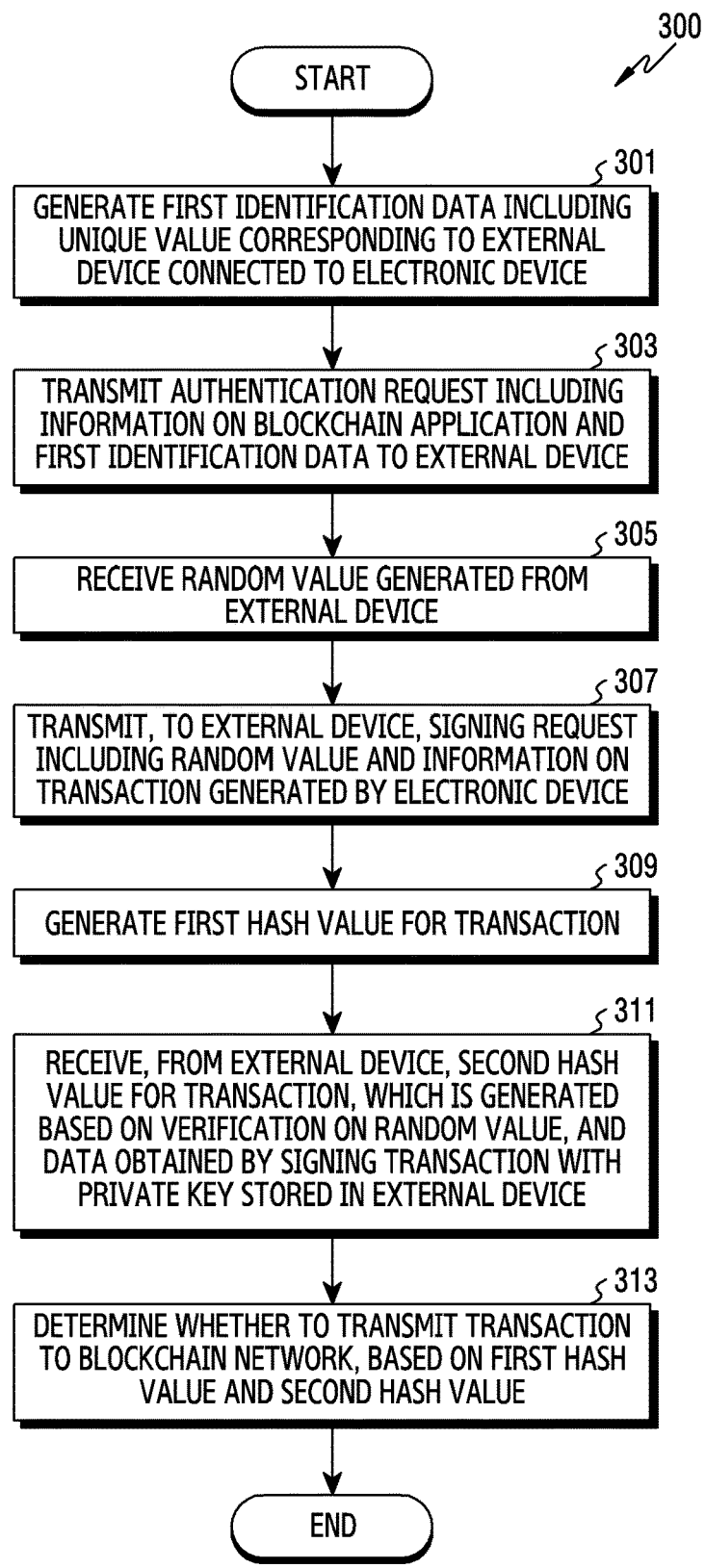
FIG. 3 is a flowchart for illustrating an operation of transmitting transaction data to a blockchain network by an electronic device according to an example embodiment.

FIG. 3 is a flowchart 300 for illustrating an operation of transmitting transaction data to a blockchain network by an electronic device according to an example embodiment.

Referring to FIG. 3, in operation 301, the processor 130 may generate first identification data including a unique value corresponding to the external device 220 connected to the electronic device 100. For example, the processor 130 may identify the connection of the external device 220, and when there is a request to connect the external device 220 or perform a transaction, may generate first identification data corresponding to the external device 220 via the key-manager 213. For example, based on a request to connect the external device 220 or based on a request to perform a transaction, the processor 130 may generate the first identification data corresponding to the external device 220. According to an example embodiment, the processor 130 may use the key-manager 213 to generate the first identification data corresponding to the external device 220.

According to an example embodiment, in operation 303, the processor 130 may transmit, to the external device 220, an authentication request including the first identification data and information on the blockchain application 211. For example, the processor 130 may transmit, to the external device 220, the authentication request including the first identification data and data indicating an application package name of the blockchain application 211.

According to an example embodiment, in operation 305, the processor 130 may receive a random value (e.g., a nonce value) generated from the external device 220. For example, the external device 220 may perform verification of the electronic device 100 and/or verification of the blockchain application, and may generate a random value when the verification is successful. According to an example, the external device 220 may perform authentication of the electronic device 100 and/or authentication of the blockchain application, and may generate a random value based on a result of the authentication being successful. The external device 220 may transmit the generated random value to the electronic device 100.

According to an example embodiment, in operation 307, the processor 130 may transmit, to the external device 220, a signature request including information on a transaction generated by the electronic device 100 and the random value. For example, the processor 130 may request, from the external device 220, digital signature for the transaction. According to an example embodiment, the processor 130 may transmit, to the external device 220, the signature request including the transaction and the random value received from the external device 220.

According to an example embodiment, in operation 309, the processor 130 may generate a first hash value for the transaction. According to an example embodiment, the processor 130 may generate the first hash value for the transaction requested to be performed. For example, the processor 130 may generate the first hash value for the transaction via the key-manager 213. The description regarding the hash values described with reference to FIG. 1 and FIG. 2 are not repeated. For instance, the description of the hash values described with reference to FIG. 1 and FIG. 2 may apply to the first hash value.

According to an example embodiment, in operation 311, the processor 130 may receive, from the external device 220, a second hash value for the transaction, which is generated based on verification of the random value, and data obtained by signing the transaction with the private key 225 stored in the external device 220. According to an example embodiment, in response to reception of the random value from the electronic device 100, the external device 220 may verify whether the random value generated by the external device 220 matches the random value received from the electronic device 100. If the verification is successful, the external device 220 may determine that there is no security problem, generate the second hash value for the transaction, and perform digital signature to the transaction with the private key 225.

According to an example embodiment, in operation 313, the processor 130 may determine whether to transmit the transaction to the blockchain network 230, based on the first hash value and the second hash value. For example, when the first hash value and the second hash value match, the processor 130 may determine to transmit the transaction to the blockchain network 230. As another example, when the first hash value and the second hash value do not match, the processor 130 may determine not to transmit the transaction to the blockchain network 230.

Figure 4:
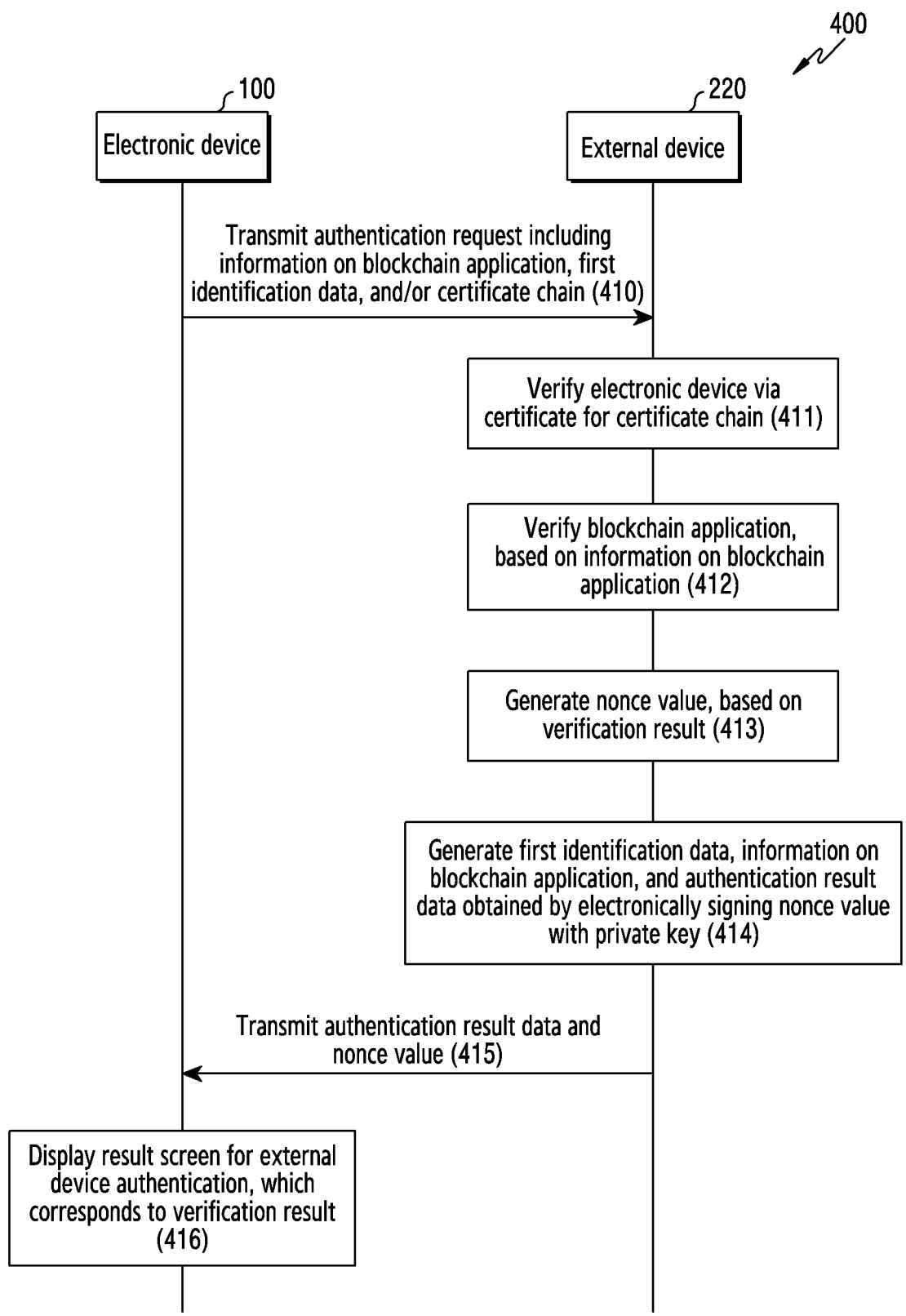
FIG. 4 is a flowchart illustrating a verification operation for an electronic device and a blockchain application in the electronic device and an external device according to an example embodiment.

FIG. 4 is a flowchart 400 illustrating a verification operation for an electronic device and a blockchain application in the electronic device and an external device according to an example embodiment.

Referring to FIG. 4, operations of the electronic device 100 and the external device 220 for verification of a blockchain application (e.g., the blockchain application 211 of FIG. 2) are shown.

According to an example embodiment, the electronic device 100 may transmit 410 an authentication request including information on the blockchain application 211, first identification data, and/or the authentication key chain 212 to the external device 220. According to an example embodiment, the first identification data may be generated via the method of generating the first identification data described with reference to FIG. 1 to FIG. 3.

According to an example embodiment, the external device 220 may perform verification 411 of the electronic device 100 via the certificate 224 for the authentication key chain 212. For example, the external device 220 may determine, using the certificate 224, whether the electronic device 100 has been tampered with.

According to an example embodiment, the external device 220 may verify 412 the blockchain application 211, based on information on the blockchain application 211. For example, the external device 220 may receive information indicating a package name for the blockchain application 211, and may verify the blockchain application 211, based on the received package name. According to an example embodiment, the external device 220 may include information (e.g., black/white list information) on blockchain-related applications. Accordingly, the external device 220 may verify the blockchain application 211, based on whether the package name of the blockchain application 211 is included in a black/white list. For example, if the package name is included in the black list, the external device 220 may determine that verification of the blockchain application 211 has failed. As another example, if the package name is included in the white list, the external device 220 may determine that verification of the blockchain application 211 is successful. According to one or more example embodiments, verification of the blockchain application 211 may be performed without being limited to the above.

According to an example embodiment, the external device 220 may generate 413 a nonce value, based on a result of the verification 411 and/or a result of the verification 412. According to an example embodiment, if the verification 411 and/or the verification 412 are successful, the external device 220 may generate a nonce value. For example, as a result of verifying the electronic device 100 via the certificate 224 for the authentication key chain 212, if the verification is successful, a nonce value may be generated. For example, if verification of the blockchain application 211 is successful, a nonce value may be generated.

According to an example embodiment, if the verification 411 and/or the verification 412 fail, operations 413 to 415 may not be performed. For example, when the verification 411 and/or the verification 412 fail, the external device 220 may transmit a message for an authentication failure to the electronic device 100 without generating a nonce value. In response to the above, the electronic device 100 may display 416 a result screen for authentication of the external device 220, which corresponds to the verification result. That is, when the electronic device 100 receives a message for the authentication failure, the processor 130 may display, via the display 120, a screen indicating that authentication for the electronic device 100 and/or the blockchain application 211 has failed.

According to an example embodiment, the external device 220 may generate 414 authentication result data with digital signature with the private key 225 with respect to the first identification data, information on the blockchain application, and the nonce value. For example, the external device 220 may generate 413 a nonce value, may perform digital signature, with the private key 225, the first identification data, information on the blockchain application, and/or the nonce value, and may generate authentication result data including signature data obtained by performing digital signature, with the private key 225, the first identification data, the information on the blockchain application, and/or the nonce value.

According to an example embodiment, the external device 220 may transmit 415 the authentication result data and the nonce value to the electronic device 100.

According to an example embodiment, the electronic device 100 may display 416 a result screen for authentication of the external device 220, which corresponds to the verification result. For example, when the authentication result data and the nonce value are received from the external device 220, the electronic device 100 may determine that authentication has been successful. Accordingly, the electronic device 100 may display, via the display 120, a screen indicating that authentication has been successful. As another example, if authentication is successful, the electronic device 100 may display, via the display 120, a screen for a subsequent operation, as the result screen for authentication.

Figure 5:
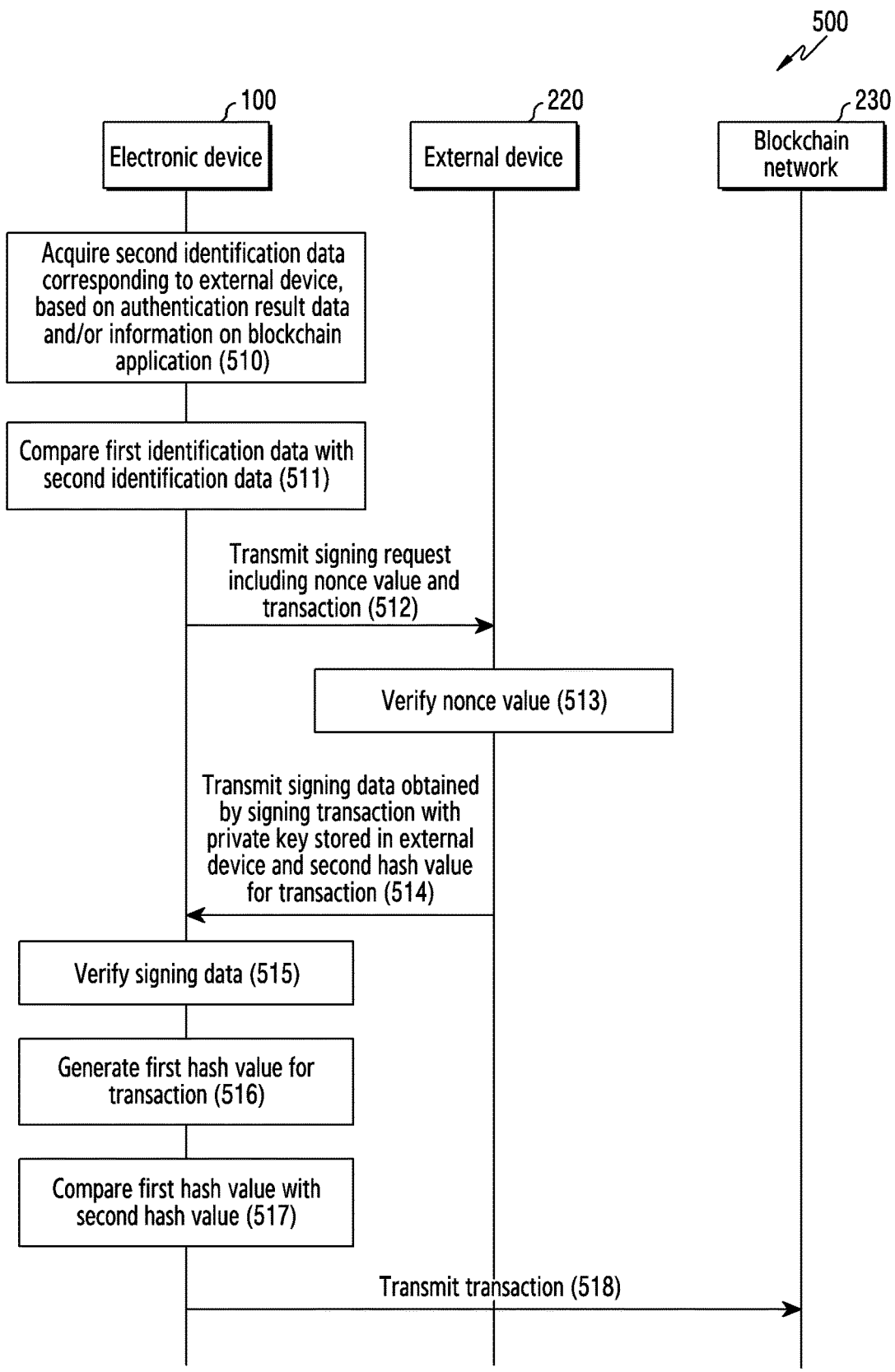
FIG. 5 is a flowchart illustrating an operation of confirming a transaction and transmitting the confirmed transaction to a blockchain network, via an electronic device according to an example embodiment.

FIG. 5 is a flowchart 500 illustrating an operation of confirming a transaction and transmitting the confirmed transaction to a blockchain network, via an electronic device according to an example embodiment.

Referring to FIG. 5, the electronic device (e.g., the electronic device 100 of FIG. 1) and the blockchain application 211 are verified, and in operation 510, the verified electronic device 100 may acquire second identification data corresponding to the external device 220, based on authentication result data and/or information on the blockchain application 211. For example, the processor 130 of the electronic device 100 may input, as arguments, information on the blockchain application 211 and authentication result data, and may call a function to return identification data for the external device 220 so as to acquire the second identification data.

According to an example embodiment, in operation 511, the electronic device 100 may compare the first identification data with the second identification data. For example, the electronic device 100 may compare the first identification data generated from the electronic device 100 with the second identification data generated based on the authentication result data received from the external device 220, thereby determining whether the first identification data and the second identification data match. The electronic device 100 may determine, via the comparison operation 511, whether the blockchain application 211 is a damaged application or whether there is a security problem in a connection of the electronic device 100 and/or the external device 220.

According to an example embodiment, as a result of the comparison operation 511, if it is determined that the first identification data and the second identification data do not match, the electronic device 100 may terminate an operation for a transaction. Accordingly, operations 512 to 518 may be omitted. According to an example embodiment, as the result of the comparison operation 511, if it is determined that the first identification data and the second identification data do not match, the electronic device 100 may display, via the display 120, a screen indicating that authentication for the external device 220 has failed.

According to an example embodiment, as the result of the comparison operation 511, if it is determined that the first identification data and the second identification data match, in operation 512, the electronic device 100 may transmit a signature request including the transaction and a nonce value to the external device 220. For example, the electronic device 100 may transmit, to the external device 220, the signature request for the transaction requested to be performed.

According to an example embodiment, in operation 513, the external device 220 may verify the nonce value. For example, the external device 220 may determine whether the nonce value received from the electronic device 100 matches a nonce value generated by the external device 220. If both nonce values do not match, the external device 220 may determine that there is a security problem in the blockchain system or in the connection of the electronic device 100 and the external device 220. According to an example embodiment, if the nonce value verification 513 fails, operations 514 to 518 may be omitted. Therefore, transmission of the transaction is terminated, and the electronic device 100 may display, via the display 120, a screen indicating that the transaction transmission has failed and/or a screen indicating that verification has failed.

According to an example embodiment, if the nonce value received from the electronic device 100 matches the nonce value generated by the external device 220, the external device 220 may perform digital signature to the transaction with the private key 225. The external device 220 may generate a second hash value for the transaction.

According to an example embodiment, in operation 514, the external device 220 may transmit the signature data obtained by signing the transaction with the private key 225 stored in the external device 220 and the second hash value for the transaction.

According to an example embodiment, in operation 515, the electronic device 100 may verify the signature data. For example, the electronic device 100 may verify the signature data, based on an address of the blockchain network 230 of the electronic device 100, which is acquired based on the signature data. In this case, if the verification operation 515 for the signature data fails, the electronic device 100 may terminate the operation for transmitting the transaction. Accordingly, operations 516 to 518 may be omitted.

According to an example embodiment, if the signature data verification operation 515 succeeds, in operation 516, the electronic device 100 may generate a first hash value for the transaction. For example, the electronic device 100 may generate, via the key-manager 213, the first hash value for the transaction requested to be performed.

According to an example embodiment, in operation 517, the electronic device 100 may compare the first hash value with the second hash value. For example, the electronic device 100 may compare the second hash value acquired from the external device 220 with the first hash value generated via the electronic device 100. The electronic device 100 may identify whether the transaction has been tampered with, by comparing the first hash value with the second hash value.

According to an example embodiment, the electronic device 100 may determine, via the processor 130, whether the first hash value and the second hash value match. As another example, the electronic device 100 may display, via the display 120, a screen for requesting of the comparison between the first hash value and the second hash value, and may acquire a user's response to the screen for requesting of the comparison. The electronic device 100 may determine whether the first hash value and the second hash value match, based on the user's response.

According to an example embodiment, in operation 518, the electronic device 100 may determine whether to transmit the transaction, based on the first hash value and the second hash value. For example, if it is determined, as a result of the comparison operation 517, that the first hash value and the second hash value match, the electronic device 100 may determine that the transaction has not been tampered with. Accordingly, in operation 518, the electronic device 100 may transmit the transaction to the blockchain network 230.

According to another example, if it is determined, as the result of the comparison operation 517, that the first hash value and the second hash value do not match, the electronic device 100 may determine that the transaction has been tampered with. Accordingly, the electronic device 100 may terminate the operation for the transaction without transmitting the transaction to the blockchain network 230. The electronic device 100 may display, via the display 120, a screen indicating determination that the first hash value and the second hash value do not match.

Some of the authentication, verification, and comparison described with reference to FIGS. 4 and 5 may be omitted as necessary, and if there is an omitted operation, the following operation may be performed. For example, if the signature data verification operation 515 is omitted, the electronic device 100 may perform operation 516 subsequently to operation 514 without performing operation 515.

Figure 6:
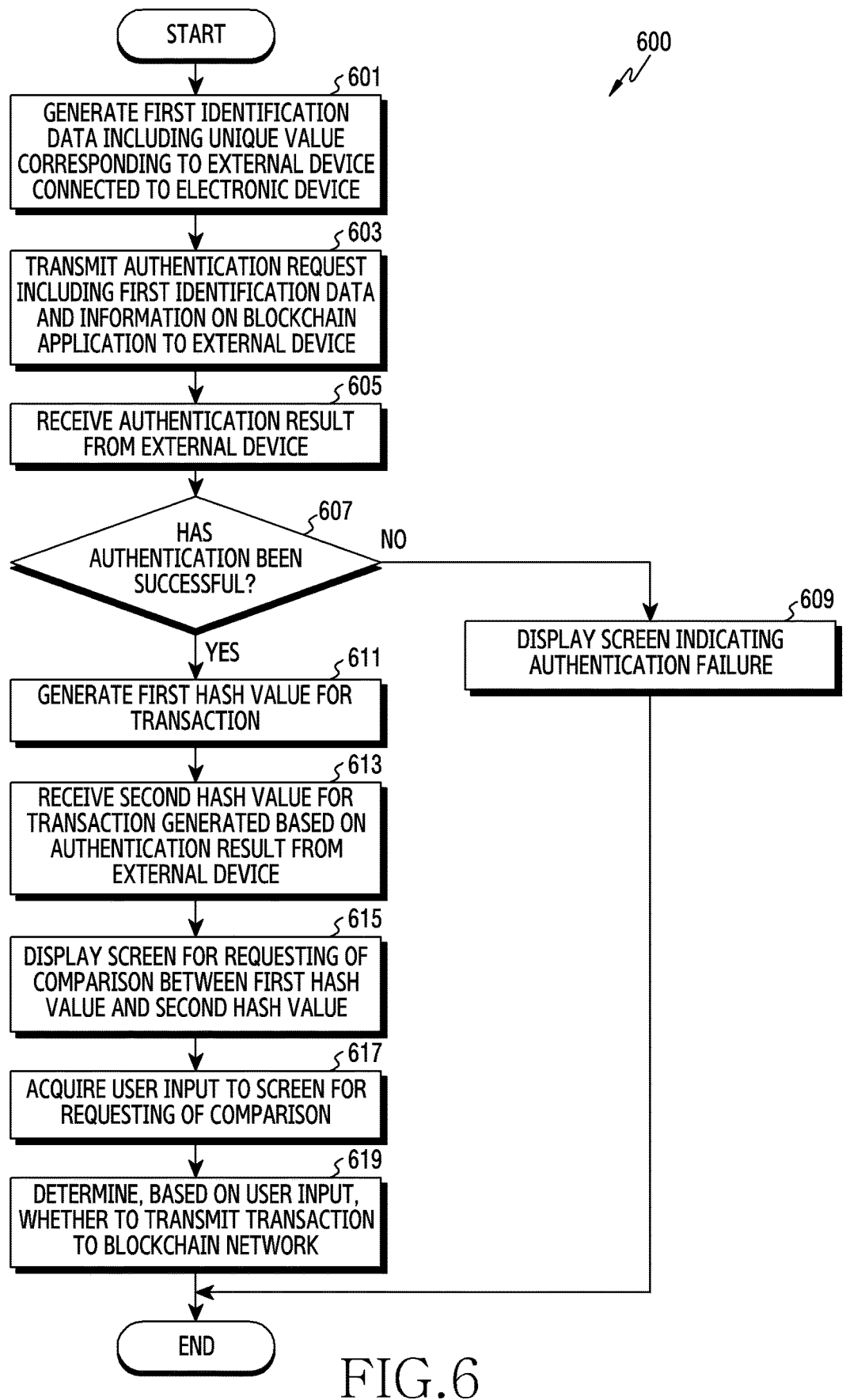
FIG. 6 is a flowchart for illustrating an operation of transmitting, based on an input acquired from a user, a transaction to a blockchain network by an electronic device according to an example embodiment.

FIG. 6 is a flowchart 600 for illustrating an operation of transmitting, based on an input acquired from a user, a transaction to a blockchain network by an electronic device according to an example embodiment.

Referring to FIG. 6, in operation 601, the processor 130 may generate first identification data including a unique value corresponding to the external device 220 connected to the electronic device 100.

According to an example embodiment, in operation 603, the processor 130 may transmit, to the external device 220, an authentication request including the first identification data and information on the blockchain application 211.

According to an example embodiment, in operation 605, the processor 130 may receive an authentication result from the external device 220. The authentication result may be generated via the operations (e.g., at least some of operations 411 to 414) of the external device 220 described with reference to FIG. 4.

According to an example embodiment, in operation 607, the processor 130 may determine whether authentication for the electronic device 100 and/or the blockchain application 211 is successful. For example, when a message indicating an authentication failure (verification failure) is received from the external device 220, it may be determined that authentication has failed. As another example, when a nonce value and/or authentication result data are received from the external device 220, it may be determined that authentication is successful. In an example embodiment, when it is determined that the authentication is successful, the authentication result may include signature data obtained by performing digital signature, with the private key 225 included in the external device 220, for the nonce value, information on the blockchain application 211, and the first identification data.

In an example embodiment, at least one processor 130 may compare the first identification data with second identification data, and may display, via the display 120, a screen indicating a warning to the external device 220 if the first identification data and the second identification data are different.

According to an example embodiment, the processor 130 may receive, from the external device 220, the nonce value received if authentication is successful, and may transmit, to the external device 220, a signature request including the nonce value and data for a transaction requested to be performed. The processor 130 may display a screen indicating information on the transaction, via the display 120.

According to an example embodiment, when it is determined that authentication has failed, the processor 130 may display, in operation 609, a screen indicating the authentication failure.

According to an example embodiment, in operation 611, when it is determined that authentication is successful, the processor 130 may generate a first hash value for the transaction.

According to an example embodiment, in operation 613, the processor 130 may receive, from the external device 220, a second hash value for the transaction, which is generated based on the authentication result.

According to an example embodiment, in operation 615, the processor 130 may display a screen for requesting of comparison between the first hash value and the second hash value. For example, the processor 130 may display, via the display 120, a first visual object corresponding to the first hash value and a second visual object corresponding to the second hash value. According to an example embodiment, the first visual object and/or the second visual object may include at least one of a symbol, a character, a figure, and a color.

According to an example embodiment, in operation 617, the processor 130 may acquire a user input for the screen for requesting of the comparison. For example, the processor 130 may acquire a user input with respect to a result of comparing the first visual object and the second visual object by a user.

According to an example embodiment, in operation 619, the processor 130 may determine whether to transmit the transaction to the blockchain network 230, based on the user input. For example, if the user input corresponds to matching of the first hash value and the second hash, the processor 130 may transmit the transaction to the blockchain network 230. For another example, if the user input corresponds to non-matching of the first hash value and the second hash, the processor 130 may display a screen indicating that the transaction cannot be transmitted and/or a screen indicating that the transaction has been tampered with, without transmitting the transaction to the blockchain network 230.

Figure 7:
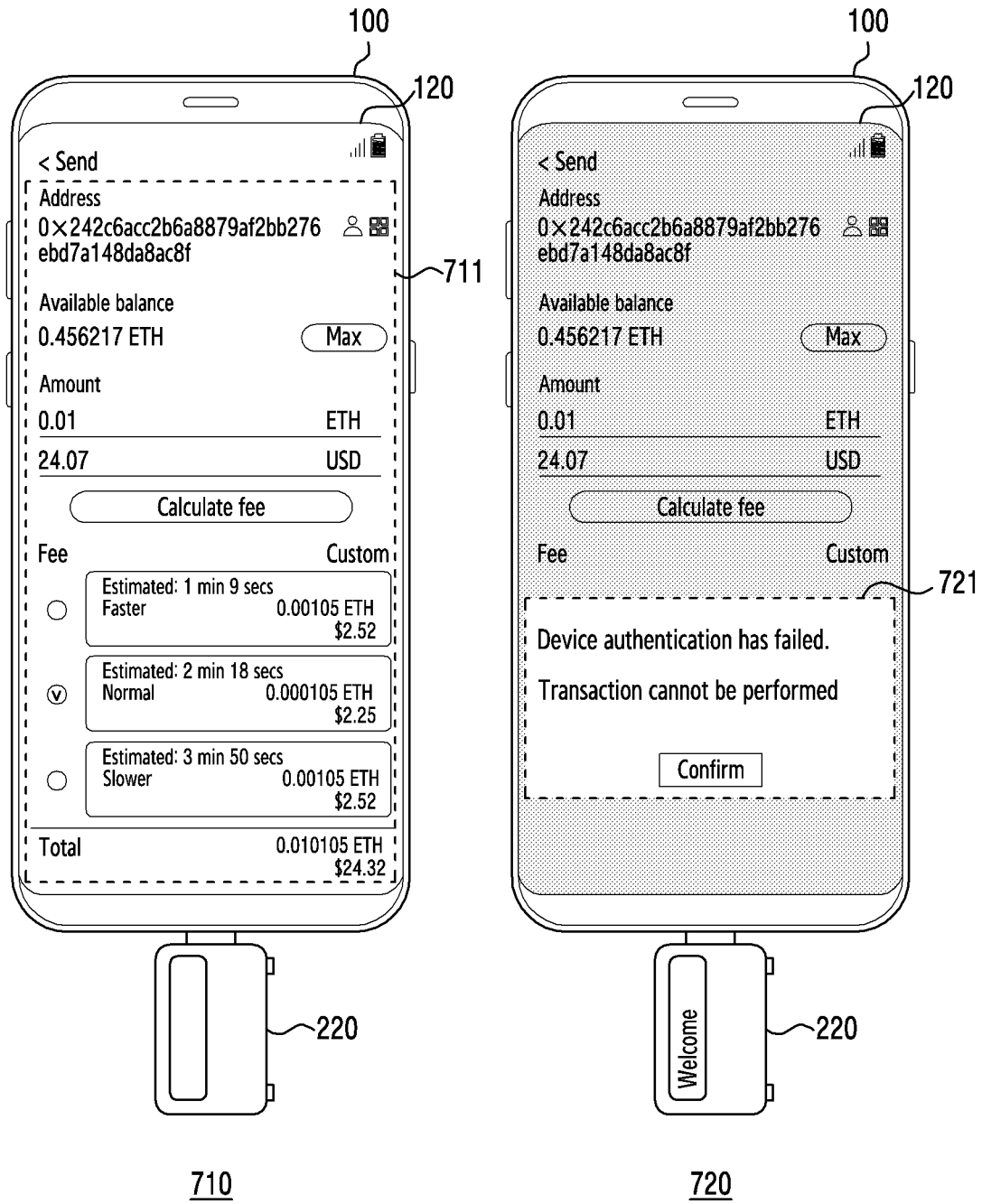
FIG. 7 is a diagram for illustrating an authentication result User Interface (UI) for an electronic device, which is displayed on a display, in the electronic device according to an example embodiment.

FIG. 7 is a diagram for illustrating an authentication result UI for an electronic device, which is displayed on a display, in the electronic device according to an example embodiment.

Referring to FIG. 7, a first screen 710 representing a screen displaying information on a transaction and a second screen 720 representing a result of authentication are shown.

According to an example embodiment, the electronic device 100 may be connected to the external device 220. According to an example embodiment, when an operation for the blockchain application 211 is performed using the external device 220, the electronic device 100 may display, via the display 120, a screen indicating the same. For example, the electronic device 100 may display, via the display 120, a screen for sending blockchain currency by using the external device 220.

According to an example embodiment, when a transaction is requested based on a user or another application, that is, when a transaction is generated, the electronic device 100 may display, via the display 120, a screen indicating information 711 on the transaction. For example, the screen indicating the information 711 on the transaction may include at least one of account information of a sender, account information of a receiver, a fee, and an amount if the transaction is related to sending blockchain currency.

According to an example embodiment, the electronic device 100 may display, via the display 120, a second screen 720 indicating a result of authentication for the electronic device 100 and/or the blockchain application 211, which is described with reference to FIG. 4. For example, if authentication for the electronic device 100 and/or the blockchain application 211 fails, the electronic device 100 may display a screen including an authentication failure message 721. For example, if the authentication fails, the electronic device 100 may display, via the display 120, the authentication failure message 721 including "Device authentication has failed. Transaction cannot be performed".

Figure 8:
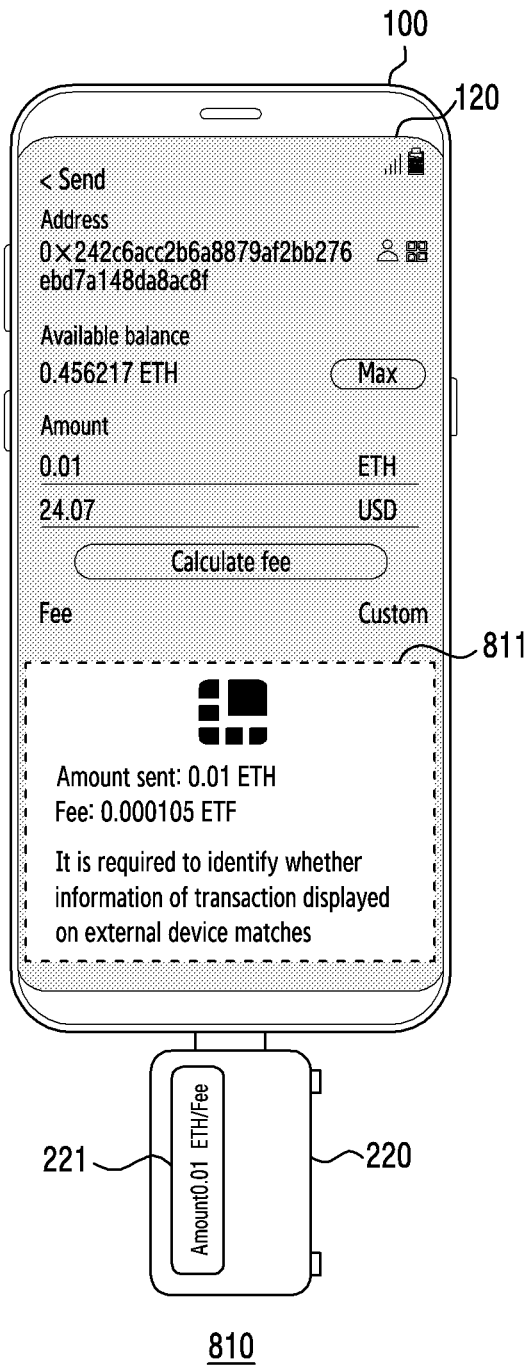
FIG. 8 is a diagram for illustrating an information UI for a transaction, which is displayed on each display, in an electronic device and an external device.

FIG. 8 is a diagram for illustrating an information UI for a transaction, which is displayed on each display, in an electronic device and an external device.

Referring to FIG. 8, a third screen 810 indicating a screen displaying information on a transaction is shown. According to an example embodiment, information on the transaction may be displayed via the display 120 of the electronic device 100 and/or the display 221 of the external device 220.

According to an example embodiment, when an operation for the blockchain application 211 is performed using the external device 220, the electronic device 100 may display, via the display 120, a screen indicating the same. For example, the electronic device 100 may display, via the display 120, a screen for sending blockchain currency by using the external device 220.

According to an example embodiment, when the transaction is requested based on a user or another application, that is, when the transaction is generated, the electronic device 100 may display, via the display 120, a screen indicating information 811 on the transaction. For example, the screen displaying the information 811 on the transaction may include an amount sent and/or a fee. According to an example embodiment, the transaction information 811 may include a guide phrase for confirming whether the transaction information displayed on the external device 220 matches. For example, the transaction information 811 may include "It is required to identify whether information of the transaction displayed on the external device matches" or a similar phrase.

According to an example embodiment, when the electronic device 100 displays a screen including the transaction information 811, the display 221 of the external device 220 may display information similar to the transaction information 811. For example, the display 221 of the external device 220 may display information on an amount sent and/or a fee of the transaction.

According to an example embodiment, a user of the electronic device 100 may identify whether the transaction has been tampered with, via the screen displayed via the display 120 and the display 221 of the external device 220.

Figure 9A:
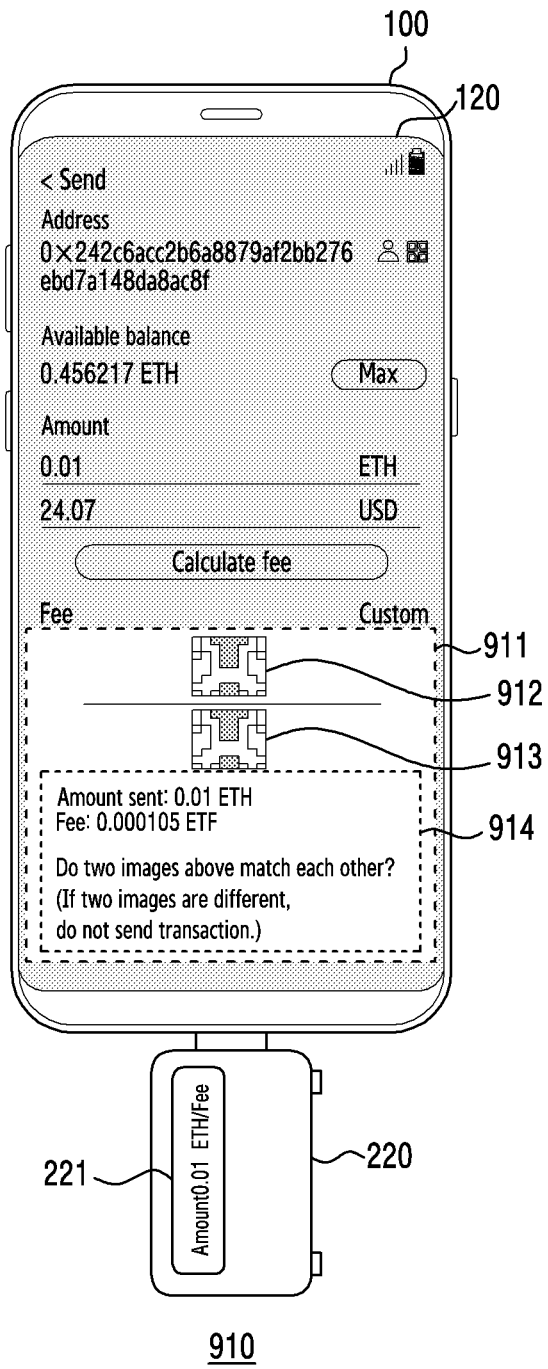
FIGS. 9A, 9B and 9C are diagrams for illustrating UIs related to confirmation of a transaction displayed on a display of the electronic device according to example embodiments.
Figure 9B:
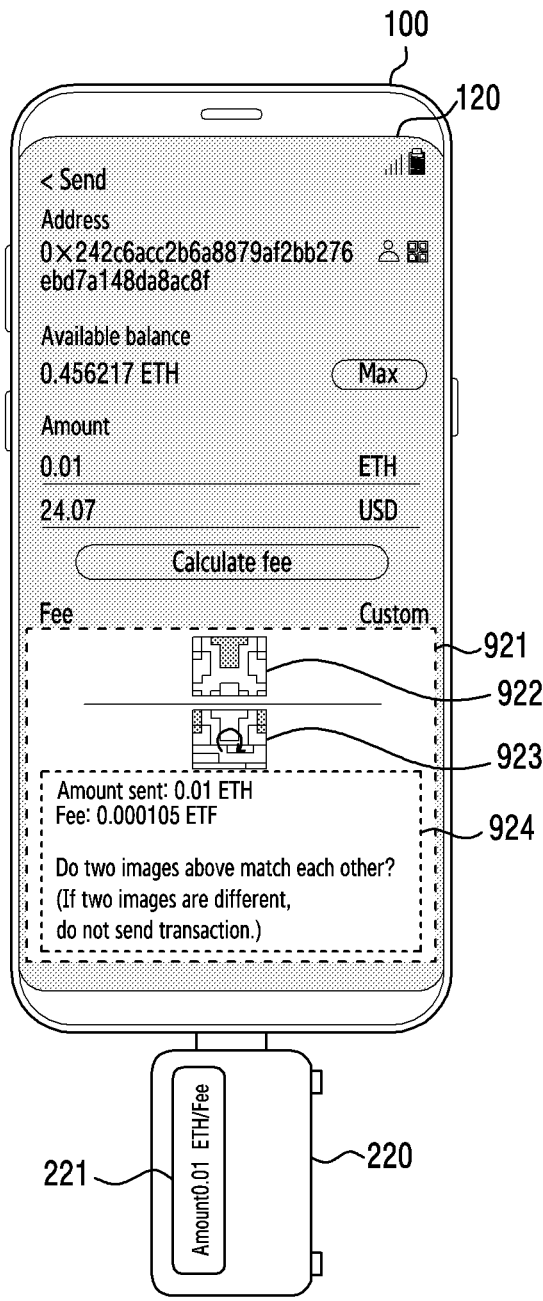
Figure 9C:
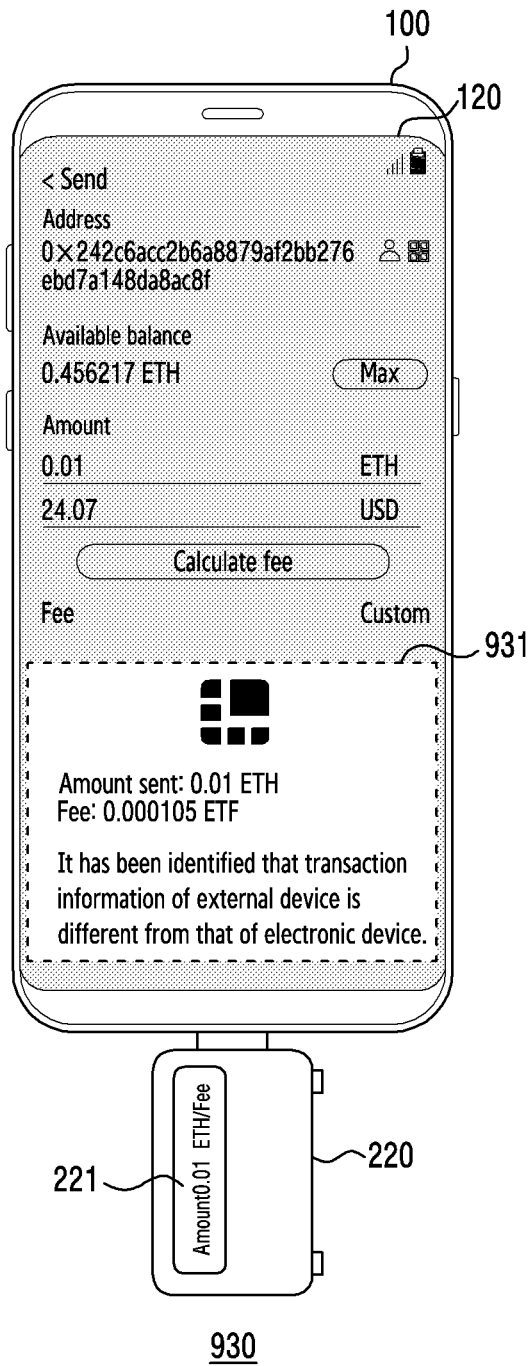

FIGS. 9A, 9B and 9C are diagrams for illustrating UIs related to confirmation of a transaction displayed on a display of the electronic device according to example embodiments.

Referring to FIGS. 9A and 9B, a fourth screen 910 and a fifth screen 920 are illustrated. The fourth screen 910 indicates a screen showing matching of the first hash value and the second hash value described with reference to FIG. 5, and the fifth screen 920 indicates a screen showing non-matching of the first hash value and the second hash value. Referring to FIG. 9C, a sixth screen 930 indicating a screen showing a confirmation failure for the transaction is illustrated.

According to an example embodiment, the electronic device 100 may display, via the display 120, a screen for comparison between a first identification value indicating a unique value for a transaction generated via the electronic device 100 and a second identification value for a transaction received via the external device 220. For example, a first comparison screen 911 for comparison between the first identification value and the second identification value may include a first visual object 912 corresponding to the first identification value and a second visual object 913 corresponding to the second identification value. The fourth screen 910 may include user guidance area 914 for acquiring a result of the comparison between the first identification value and the second identification value. For example, the user guidance area 914 may include a selectable field for a user to input a result corresponding to the first visual object 912 and the second visual object 913 output for comparison. For instance, the user guidance area 914 may include questions and/or phrases such as "Do the two images match??" or a phrase similar thereto.

According to an example embodiment, if the transaction has not been tampered with, the first visual object 912 and the second visual object 913 may match. The user of the electronic device 100 may determine whether the first visual object 912 and the second visual object 913 match, and may input a result thereof via the display 120. Accordingly, the electronic device 100 may acquire a user input for requesting to compare the first identification value and the second identification value. The electronic device 100 is not limited to the above and may acquire user inputs via various methods.

According to an example embodiment, the electronic device 100 may display, via the display 120, a screen for comparison between a first identification value indicating a unique value for a transaction generated via the electronic device 100 and a second identification value for a transaction received via the external device 220. For example, a second comparison screen 921 for comparison between the first identification value and the second identification value may include a third visual object 922 corresponding to the first identification value and a fourth visual object 923 corresponding to the second identification value. The fifth screen 920 may include the user guidance area 924 for acquiring a result of the comparison between the first identification value and the second identification value. For example, the user guidance area 924 may include a selectable field for a user to input a result corresponding to the first visual object 912 and the second visual object 913 output for comparison. For instance, the user guidance area 914 may include questions and/or phrases such as "Do the two images match??" or a phrase similar thereto.

According to an example embodiment, if the transaction has been tampered with, the third visual object 922 and the fourth visual object 923 may be different. For example, the third visual object 922 and the fourth visual object 923 may be colored with different colors or may have different shapes. In an example embodiment, the user of the electronic device 100 may determine whether the third visual object 922 and the fourth visual object 923 match, and may input a result thereof via the display 120. Accordingly, the electronic device 100 may acquire a user input for requesting to compare the first identification value and the second identification value. According to an example embodiment, the user of the electronic device 100 may perform comparison more easily using relatively easy-to-identify visual objects (e.g., the first visual object 912, the second visual object 913, the third visual object 922, and/or the fourth visual object 923).

According to an example embodiment, the electronic device 100 may express a visual object corresponding to an identification value for a transaction via various methods. For example, the visual object may include at least one of a symbol, a character, a figure, and a color. For example, the electronic device 100 may display, via the visual object, information on some of a sending account, a receiving account, an amount, and a fee of information on the transaction. Account information may be displayed in hexadecimal. The electronic device 100 may display the account information via an image. In this case, the user may recognize the account information more easily.

According to an example embodiment, the electronic device 100 may display hash information for a transaction via a visual object. For example, a hash value may be distinguished with an 8-bit×3 value, and a distinguished section may be displayed by matching an RGB color.

According to an example embodiment, when a user input corresponding to non-matching between the first identification value and the second identification value is acquired from the user of the electronic device 100, and/or when the processor 130 determines that the first identification value and the second identification value are different, the electronic device 100 may display, via the display 120, a screen 931 indicating that the transaction has been tampered with.

For example, when it is determined that the transaction has been tampered with or a security problem has occurred due to non-matching between the first identification value and the second identification value, the processor 130 may display, via the display 120, the screen 931 including "It has been identified that transaction information of the external device is different from that of the electronic device" or a phrase similar thereto.

As described above, an electronic device (e.g., the electronic device 100 of FIG. 1) may include a communication circuit (e.g., the communication circuit 140 of FIG. 1) configured to communicate with a blockchain network, a display (e.g., the display 120 of FIG. 1), a memory (e.g., the memory 110 of FIG. 1) configured to store a blockchain application (e.g., the blockchain application 211 of FIG. 2), and at least one processor (e.g., the processor 130 of FIG. 1) operatively connected to the communication circuit, the display, and the memory, wherein the at least one processor is configured to generate first identification data including a unique value corresponding to an external device (e.g., the external device 220 of FIG. 2) connected to the electronic device, transmit an authentication request including information on the blockchain application and the first identification data to the external device, receive, in response to the authentication request, a random value generated from the external device if authentication via the external device is successful, transmit a signature request including the random value and information on a transaction generated by the electronic device to the external device, generate a first hash value for the transaction, receive, from the external device, a second hash value for the transaction, which is generated based on verification of the random value, and signature data obtained by performing digital signature to the transaction with a private key (e.g., the private key 225 of FIG. 2) stored in the external device, and determine whether to transmit the transaction to the blockchain network, based on the first hash value and the second hash value.

According to an example embodiment, the at least one processor may be configured to transmit, to the external device, an authentication key chain assigned to the electronic device, and the random value may be generated from the external device if verification is successful using a certificate for the authentication key chain, which is stored in the external device.

According to an example embodiment, the at least one processor may be configured to receive authentication result data generated when authentication is successful, from the external device in response to the authentication request, and the authentication result data may include the first identification data, information on the blockchain application, and data obtained by performing digital signature to the random value with the private key.

According to an example embodiment, the at least one processor may be configured to acquire, via the authentication result data, second identification data that is a unique value corresponding to the external device, compare the first identification data with the second identification data, and terminate an operation for the transaction if the first identification data and the second identification data are different.

According to an example embodiment, the at least one processor may be configured to if the authentication corresponding to the authentication request via the external device fails, acquire an error message from the external device, and in response to the error message, control the display to display a screen indicating that the authentication has failed.

According to an example embodiment, the at least one processor may be configured to may compare the first hash value with the second hash value, and transmit the transaction to the blockchain network if the first hash value and the second hash value match.

According to an example embodiment, the at least one processor may be configured to control the display to display a screen for requesting of comparison between the first hash value and the second hash value, acquire a user's response to the screen for requesting of the comparison, and transmit the transaction to the blockchain network, based on the user's response.

According to an example embodiment, the at least one processor may be configured to verify the signature data, based on an address of the blockchain network of the electronic device, which is acquired based on the signature data, and terminate an operation for the transaction in response to a failure of verification of the signature data.

As described above, an operation method of an electronic device (e.g., the electronic device 100 of FIG. 1) according to an example embodiment may include generating (e.g., operation 301 of FIG. 3) first identification data including a unique value corresponding to an external device (e.g., the external device 220 of FIG. 2) connected to the electronic device, transmitting (e.g., operation 303 of FIG. 3) an authentication request including information on a blockchain application (e.g., the blockchain application 211 of FIG. 2) stored in a memory (e.g., the memory 110 of FIG. 1) of the electronic device and the first identification data to the external device, receiving (e.g., operation 305 of FIG. 3), in response to the authentication request, a random value generated from the external device if authentication via the external device is successful, transmitting (e.g., operation 307 of FIG. 3) a signature request including the random value and data on a transaction generated by the electronic device to the external device, generating (e.g., operation 309 of FIG. 3) a first hash value for the transaction, receiving (e.g., operation 311 of FIG. 3), from the external device, a second hash value for the transaction, which is generated based on verification of the random value, and signature data obtained by performing digital signature to the transaction with a private key stored in the external device, and determining (e.g., operation 313 of FIG. 3) whether to transmit the transaction to the blockchain network, based on the first hash value and the second hash value.

According to an example embodiment, the method may further include transmitting, to the external device, an authentication key chain assigned to the electronic device, wherein the receiving of the random value includes receiving the random value generated from the external device if verification is successful using a certificate for the authentication key chain, which is stored in the external device.

According to an example embodiment, the method may further include receiving authentication result data generated when authentication corresponding to the authentication request is successful, from the external device, wherein the authentication result data includes the first identification data, information on the blockchain application, and data obtained by performing digital signature to the random value with the private key.

According to an example embodiment, the method may further include acquiring, via the authentication result data, second identification data that is a unique value corresponding to the external device, comparing the first identification data with the second identification data, and terminating an operation for the transaction if the first identification data and the second identification data are different.

According to an example embodiment, the method may further include, in response to the authentication request, if the authentication via the external device fails, acquiring an error message from the external device, and in response to the error message, controlling a display included in the electronic device so as to display a screen indicating that the authentication has failed.

According to an example embodiment, the method may further include comparing the first hash value with the second hash value, and transmitting the transaction to the blockchain network if the first hash value and the second hash value match.

According to an example embodiment, the method may further include controlling a display included in the electronic device so as to display a screen for requesting of comparison between the first hash value and the second hash value, acquiring a user's response to the screen for requesting of the comparison, and transmitting the transaction to the blockchain network, based on the user's response.

As described above, an electronic device (e.g., the electronic device 100 of FIG. 1) according to an example embodiment may include a communication circuit (e.g., the communication circuit 140 of FIG. 1) configured to communicate with a blockchain network, a display (e.g., the display 120 of FIG. 1), a memory (e.g., the memory 110 of FIG. 1) configured to store a blockchain application (e.g., the blockchain application 211 of FIG. 2), and at least one processor (e.g., the processor 130 of FIG. 1) operatively connected to the communication circuit, the display, and the memory, wherein the at least one processor is configured to generate first identification data including a unique value corresponding to an external device (e.g., the external device 220 of FIG. 2) connected to the electronic device, transmit an authentication request including information on the blockchain application and the first identification data to the external device, receive an authentication result from the external device in response to the authentication request, display an authentication result screen corresponding to the authentication result via the display, generate, based on the authentication result, a first hash value for a transaction generated by the electronic device, receive a second hash value for the transaction, which is generated based on verification of the authentication result, from the external device, display, via the display, a screen for requesting of comparison between the first hash value and the second hash value, acquire a user input to the screen for requesting of the comparison, and determine whether to transmit the transaction to the blockchain network, based on the user input.

According to an example embodiment, when indicating an authentication failure, the authentication result screen may be a screen indicating that authentication of the electronic device or the blockchain application has failed, and the at least one processor may terminate an operation for the transaction in response to the authentication failure.

According to an example embodiment if authentication corresponding to the authentication request from the external device is successful, the authentication result may include a random value generated from the external device, wherein the at least one processor is configured to transmit a signature request including the random value and data on a transaction generated by the electronic device to the external device, and display a screen indicating information on the transaction via the display.

According to an example embodiment, in response to the authentication request, if authentication from the external device is successful, the authentication result may include the first identification data, information on the blockchain application, and signature data obtained by performing digital signature to the random value with the private key, and the at least one processor may be configured to acquire, via the signature data, second identification data that is a unique value corresponding to the external device, compare the first identification data with the second identification data, and display, via the display, a screen showing a warning for the external device if the first identification data and the second identification data are different.

According to an example embodiment, a screen for requesting of comparison between the first hash value and the second hash value may include a first visual object corresponding to the first hash value and a second visual object corresponding to the second hash value, and the first visual object and the second visual object may include at least one of a symbol, a character, a figure, and a color.

Figure 10:
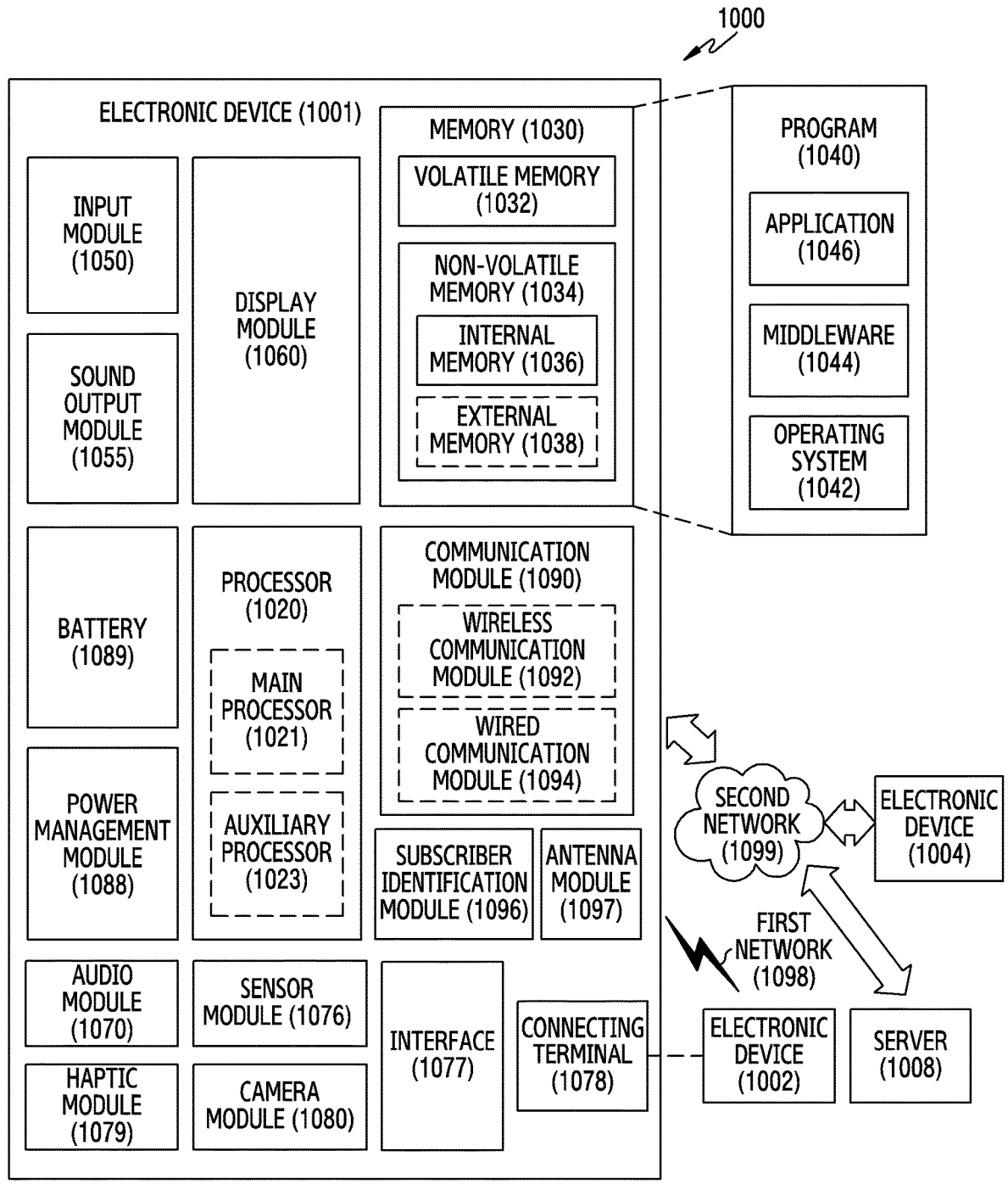
FIG. 10 is a block diagram illustrating an electronic device in a network environment according to one or more example embodiments.

FIG. 10 is a block diagram illustrating an electronic device 1001 in a network environment 1000 according to one or more example embodiments. Referring to FIG. 10, the electronic device 1001 in the network environment 1000 may communicate with an electronic device 1002 via a first network 1098 (e.g., a short-range wireless communication network), or at least one of an electronic device 1004 or a server 1008 via a second network 1099 (e.g., a long-range wireless communication network). According to an example embodiment, the electronic device 1001 may communicate with the electronic device 1004 via the server 1008. According to an example embodiment, the electronic device 1001 may include a processor 1020, memory 1030, an input module 1050, a sound output module 1055, a display module 1060, an audio module 1070, a sensor module 1076, an interface 1077, a connecting terminal 1078, a haptic module 1079, a camera module 1080, a power management module 1088, a battery 1089, a communication module 1090, a subscriber identification module (SIM) 1096, or an antenna module 1097. In some embodiments, at least one of the components (e.g., the connecting terminal 1078) may be omitted from the electronic device 1001, or one or more other components may be added in the electronic device 1001. In some embodiments, some of the components (e.g., the sensor module 1076, the camera module 1080, or the antenna module 1097) may be implemented as a single component (e.g., the display module 1060).

The processor 1020 may execute, for example, software (e.g., a program 1040) to control at least one other component (e.g., a hardware or software component) of the electronic device 1001 coupled with the processor 1020, and may perform various data processing or computation. According to one embodiment, as at least part of the data processing or computation, the processor 1020 may store a command or data received from another component (e.g., the sensor module 1076 or the communication module 1090) in volatile memory 1032, process the command or the data stored in the volatile memory 1032, and store resulting data in non-volatile memory 1034. According to an example embodiment, the processor 1020 may include a main processor 1021 (e.g., a central processing unit (CPU) or an application processor (AP)), or an auxiliary processor 1023 (e.g., a graphics processing unit (GPU), a neural processing unit (NPU), an image signal processor (ISP), a sensor hub processor, or a communication processor (CP)) that is operable independently from, or in conjunction with, the main processor 1021. For example, when the electronic device 1001 includes the main processor 1021 and the auxiliary processor 1023, the auxiliary processor 1023 may be adapted to consume less power than the main processor 1021, or to be specific to a specified function. The auxiliary processor 1023 may be implemented as separate from, or as part of the main processor 1021.

The auxiliary processor 1023 may control at least some of functions or states related to at least one component (e.g., the display module 1060, the sensor module 1076, or the communication module 1090) among the components of the electronic device 1001, instead of the main processor 1021 while the main processor 1021 is in an inactive (e.g., sleep) state, or together with the main processor 1021 while the main processor 1021 is in an active state (e.g., executing an application). According to an example embodiment, the auxiliary processor 1023 (e.g., an image signal processor or a communication processor) may be implemented as part of another component (e.g., the camera module 1080 or the communication module 1090) functionally related to the auxiliary processor 1023. According to an example embodiment, the auxiliary processor 1023 (e.g., the neural processing unit) may include a hardware structure specified for artificial intelligence model processing. An artificial intelligence model may be generated by machine learning. Such learning may be performed, e.g., by the electronic device 1001 where the artificial intelligence is performed or via a separate server (e.g., the server 1008). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1030 may store various data used by at least one component (e.g., the processor 1020 or the sensor module 1076) of the electronic device 1001. The various data may include, for example, software (e.g., the program 1040) and input data or output data for a command related thererto. The memory 1030 may include the volatile memory 1032 or the non-volatile memory 1034.

The program 1040 may be stored in the memory 1030 as software, and may include, for example, an operating system (OS) 1042, middleware 1044, or an application 1046.

The input module 1050 may receive a command or data to be used by another component (e.g., the processor 1020) of the electronic device 1001, from the outside (e.g., a user) of the electronic device 1001. The input module 1050 may include, for example, a microphone, a mouse, a keyboard, a key (e.g., a button), or a digital pen (e.g., a stylus pen).

The sound output module 1055 may output sound signals to the outside of the electronic device 1001. The sound output module 1055 may include, for example, a speaker or a receiver. The speaker may be used for general purposes, such as playing multimedia or playing record. The receiver may be used for receiving incoming calls. According to an example embodiment, the receiver may be implemented as separate from, or as part of the speaker.

The display module 1060 may visually provide information to the outside (e.g., a user) of the electronic device 1001. The display module 1060 may include, for example, a display, a hologram device, or a projector and control circuitry to control a corresponding one of the display, hologram device, and projector. According to an example embodiment, the display module 1060 may include a touch sensor adapted to detect a touch, or a pressure sensor adapted to measure the intensity of force incurred by the touch.

The audio module 1070 may convert a sound into an electrical signal and vice versa. According to an example embodiment, the audio module 1070 may obtain the sound via the input module 1050, or output the sound via the sound output module 1055 or a headphone of an external electronic device (e.g., an electronic device 1002) directly (e.g., wiredly) or wirelessly coupled with the electronic device 1001.

The sensor module 1076 may detect an operational state (e.g., power or temperature) of the electronic device 1001 or an environmental state (e.g., a state of a user) external to the electronic device 1001, and then generate an electrical signal or data value corresponding to the detected state. According to an example embodiment, the sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with the external electronic device (e.g., the electronic device 1002) directly (e.g., wiredly) or wirelessly. According to an example embodiment, the interface 1077 may include, for example, a high definition multimedia interface (HDMI), a universal serial bus (USB) interface, a secure digital (SD) card interface, or an audio interface.

A connecting terminal 1078 may include a connector via which the electronic device 1001 may be physically connected with the external electronic device (e.g., the electronic device 1002). According to an example embodiment, the connecting terminal 1078 may include, for example, a HDMI connector, a USB connector, a SD card connector, or an audio connector (e.g., a headphone connector).

The haptic module 1079 may convert an electrical signal into a mechanical stimulus (e.g., a vibration or a movement) or electrical stimulus which may be recognized by a user via his tactile sensation or kinesthetic sensation. According to an example embodiment, the haptic module 1079 may include, for example, a motor, a piezoelectric element, or an electric stimulator.

The camera module 1080 may capture a still image or moving images. According to an example embodiment, the camera module 1080 may include one or more lenses, image sensors, image signal processors, or flashes.

The power management module 1088 may manage power supplied to the electronic device 1001. According to one embodiment, the power management module 1088 may be implemented as at least part of, for example, a power management integrated circuit (PMIC).

The battery 1089 may supply power to at least one component of the electronic device 1001. According to an example embodiment, the battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 1001 and the external electronic device (e.g., the electronic device 1002, the electronic device 1004, or the server 1008) and performing communication via the established communication channel. The communication module 1090 may include one or more communication processors that are operable independently from the processor 1020 (e.g., the application processor (AP)) and supports a direct (e.g., wired) communication or a wireless communication. According to an example embodiment, the communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device via the first network 1098 (e.g., a short-range communication network, such as Bluetooth™, wireless-fidelity (Wi-Fi) direct, or infrared data association (IrDA)) or the second network 1099 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1092 may identify and authenticate the electronic device 1001 in a communication network, such as the first network 1098 or the second network 1099, using subscriber information (e.g., international mobile subscriber identity (IMSI)) stored in the subscriber identification module 1096.

The wireless communication module 1092 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1092 may support a high-frequency band (e.g., the mmWave band) to achieve, e.g., a high data transmission rate. The wireless communication module 1092 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1092 may support various requirements specified in the electronic device 1001, an external electronic device (e.g., the electronic device 1004), or a network system (e.g., the second network 1099). According to an example embodiment, the wireless communication module 1092 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1097 may transmit or receive a signal or power to or from the outside (e.g., the external electronic device) of the electronic device 1001. According to an example embodiment, the antenna module 1097 may include an antenna including a radiating element composed of a conductive material or a conductive pattern formed in or on a substrate (e.g., a printed circuit board (PCB)). According to an example embodiment, the antenna module 1097 may include a plurality of antennas (e.g., array antennas). In such a case, at least one antenna appropriate for a communication scheme used in the communication network, such as the first network 1098 or the second network 1099, may be selected, for example, by the communication module 1090 (e.g., the wireless communication module 1092) from the plurality of antennas. The signal or the power may then be transmitted or received between the communication module 1090 and the external electronic device via the selected at least one antenna. According to an example embodiment, another component (e.g., a radio frequency integrated circuit (RFIC)) other than the radiating element may be additionally formed as part of the antenna module 1097.

According to one or more example embodiments, the antenna module 1097 may form a mmWave antenna module. According to an example embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 1001 and the external electronic device 1004 via the server 1008 coupled with the second network 1099. Each of the electronic devices 1002 or 1004 may be a device of a same type as, or a different type, from the electronic device 1001. According to an example embodiment, all or some of operations to be executed at the electronic device 1001 may be executed at one or more of the external electronic devices 1002, 1004, or 1008. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1001. The electronic device 1001 may provide the outcome, with or without further processing of the outcome, as at least part of a reply to the request. To that end, a cloud computing, distributed computing, mobile edge computing (MEC), or client-server computing technology may be used, for example. The electronic device 1001 may provide ultra low-latency services using, e.g., distributed computing or mobile edge computing. In another embodiment, the external electronic device 1004 may include an internet-of-things (IoT) device. The server 1008 may be an intelligent server using machine learning and/or a neural network. According to an example embodiment, the external electronic device 1004 or the server 1008 may be included in the second network 1099. The electronic device 1001 may be applied to intelligent services (e.g., smart home, smart city, smart car, or healthcare) based on 5G communication technology or IoT-related technology.

The electronic device according to one or more example embodiments may be one of various types of electronic devices. The electronic devices may include, for example, a portable communication device (e.g., a smartphone), a computer device, a portable multimedia device, a portable medical device, a camera, a wearable device, or a home appliance. According to an example embodiment of the disclosure, the electronic devices are not limited to those described above.

It should be appreciated that one or more example embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with one or more example embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

One or more example embodiments as set forth herein may be implemented as software (e.g., the program 1040) including one or more instructions that are stored in a storage medium (e.g., internal memory 1036 or external memory 1038) that is readable by a machine (e.g., the electronic device 1001). For example, a processor (e.g., the processor 1020) of the machine (e.g., the electronic device 1001) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an example embodiment, a method according to one or more example embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one or more example embodiments, each component (e.g., a module or a program) of the above-described components may include a single entity or multiple entities, and some of the multiple entities may be separately disposed in different components. According to one or more example embodiments, one or more of the above-described components may be omitted, or one or more other components may be added. Alternatively or additionally, a plurality of components (e.g., modules or programs) may be integrated into a single component. In such a case, according to one or more example embodiments, the integrated component may still perform one or more functions of each of the plurality of components in the same or similar manner as they are performed by a corresponding one of the plurality of components before the integration. According to one or more example embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a communication circuit configured to communicate with a blockchain network;
a display;
a memory configured to store a blockchain application; and
at least one processor configured to:
generate first identification data comprising a first value corresponding to an external device connected to the electronic device;
transmit an authentication request comprising first information and the first identification data to the external device, the first information including information related to the blockchain application;
receive a second value from the external device based on a result of the authentication request being successful;
transmit, to the external device, a signature request comprising the second value and second information, the second information including information related to a transaction generated by the electronic device;
generate a first hash value for the transaction;
receive, from the external device, a second hash value for the transaction, the second hash value being generated based on verification of the second value, and signature data obtained by performing digital signature to the transaction with a private key stored in the external device; and
determine whether to transmit the transaction to the blockchain network, based on the first hash value and the second hash value.

2. The electronic device of claim 1, wherein the at least one processor is configured to transmit, to the external device, an authentication key chain assigned to the electronic device,
wherein the second value is a random value is generated from the external device based on the result of the authentication request being successful using a certificate for the authentication key chain, which is stored in the external device.

3. The electronic device of claim 1, wherein the at least one processor is configured to receive authentication result data from the external device, based on the result of the authentication request being successful, wherein the authentication result data comprises the first identification data, information on the blockchain application, and data obtained by performing digital signature to the second value with the private key.

4. The electronic device of claim 3, wherein the at least one processor is configured to:
acquire, based on the authentication result data, second identification data that is a unique value corresponding to the external device,
compare the first identification data with the second identification data, and
terminate an operation for the transaction based on the first identification data and the second identification data being different.

5. The electronic device of claim 1, wherein the at least one processor is configured to:
acquire an error message from the external device based on the result of the authentication request being unsuccessful, and
in response to the error message, control the display to display a screen indicating that the authentication request has failed.

6. The electronic device of claim 1, wherein the at least one processor is configured to:
compare the first hash value with the second hash value, and
transmit the transaction to the blockchain network based on a match between the first hash value and the second hash value.

7. The electronic device of claim 1, wherein the at least one processor is configured to:
control the display to display a screen for requesting a comparison between the first hash value and the second hash value,
receive a user input corresponding to the comparison request displayed on the screen, and
transmit the transaction to the blockchain network, based on the user input.

8. The electronic device of claim 1, wherein the at least one processor is configured to:
verify the signature data, based on an address of the blockchain network of the electronic device, which is acquired based on the signature data, and
terminate an operation for the transaction in response to a failure of verification of the signature data.

9. An operation method of an electronic device, the method comprising:
generating first identification data comprising a first value corresponding to an external device communicatively connected to the electronic device;
transmitting an authentication request comprising first information and the first identification data to the external device, the first information including information related to a blockchain application;

in response to the authentication request, receiving a second value from the external device based on a result of the authentication request being successful;
transmitting, to the external device, a signature request comprising the second value and second information, the second information including information related to a transaction generated by the electronic device;
generating a first hash value for the transaction;
receiving, from the external device, a second hash value for the transaction, the second hash value being generated based on verification of the second value, and signature data obtained by performing digital signature to the transaction with a private key stored in the external device; and
determining whether to transmit the transaction to a blockchain network, based on the first hash value and the second hash value.

10. The method of claim 9, further comprising transmitting, to the external device, an authentication key chain assigned to the electronic device,
wherein the second value is a random value generated from the external device based on the authentication request being successful using a certificate for the authentication key chain, which is stored in the external device.

11. The method of claim 9, further comprising receiving authentication result data from the external device based on the result of the authentication request being successful,
wherein the authentication result data comprises the first identification data, information on the blockchain application, and data obtained by performing digital signature to the second value with the private key.

12. The method of claim 11, further comprising:
acquiring, based on the authentication result data, second identification data that is a unique value corresponding to the external device;
comparing the first identification data with the second identification data; and
terminating an operation for the transaction based on the first identification data and the second identification data being different.

13. The method of claim 9, further comprising:
acquiring an error message from the external device based on the result of the authentication request being unsuccessful; and
in response to the error message, controlling a display included in the electronic device so as to display a screen indicating that the authentication request has failed.

14. The method of claim 9, further comprising:
comparing the first hash value with the second hash value; and
transmitting the transaction to the blockchain network based on a match between the first hash value and the second hash value match.

15. The method of claim 9, further comprising:
controlling a display included in the electronic device to display a screen for requesting a comparison between the first hash value and the second hash value;
receiving a user input corresponding to the comparison request displayed on the screen; and
transmitting the transaction to the blockchain network, based on the user input.

16. An electronic device comprising:
a communication circuit configured to communicate with a blockchain network;
a display;
a memory configured to store a blockchain application; and
at least one processor configured to:
generate first identification data comprising a first value corresponding to an external device connected to the electronic device;
transmit an authentication request comprising first information and the first identification data to the external device, the first information including information related to the blockchain application;
receive an authentication result from the external device in response to the authentication request;
display an authentication result screen corresponding to the authentication result on the display;
based on the authentication result, generate a first hash value for a transaction generated by the electronic device;
receive, from the external device, a second hash value for the transaction, the second hash value being generated based on the authentication result;
display a screen, on the display, for requesting a comparison between the first hash value and the second hash value;
receive a user input corresponding to the comparison request; and
determine whether to transmit the transaction to the blockchain network, based on the user input.

17. The electronic device of claim 16, wherein, in case of indicating an authentication failure, the authentication result screen is a screen indicating that authentication of the electronic device or the blockchain application has failed, and
the at least one processor is configured to terminate an operation for the transaction in response to the authentication failure.

18. The electronic device of claim 16, wherein, in case that authentication corresponding to the authentication request is successful, the authentication result comprises a second value generated from the external device,
wherein the at least one processor is configured to:
transmit a signature request comprising the second value and data on a transaction generated by the electronic device to the external device, and
display a screen indicating information on the transaction via the display.

19. The electronic device of claim 18, wherein, in response to the authentication request, in case that authentication from the external device is successful, the authentication result comprises the first identification data, the first information on the blockchain application, and signature data obtained by performing digital signature to the second value with a private key, and
the at least one processor is configured to acquire, via the signature data, second identification data that is a unique value corresponding to the external device,
compare the first identification data with the second identification data, and
display, on the display, a screen showing a warning for the external device in case that the first identification data and the second identification data are different.

20. The electronic device of claim 16, wherein a screen for requesting of comparison between the first hash value and the second hash value comprises a first visual object corresponding to the first hash value and a second visual object corresponding to the second hash value, and the first visual object and the second visual object comprise at least one of a symbol, a character, a figure, and a color.

\* \* \* \* \*